United States Patent
Tamada et al.

(10) Patent No.: US 10,144,199 B2
(45) Date of Patent: Dec. 4, 2018

(54) CELLULOSE ACYLATE FILM, MANUFACTURING METHOD OF CELLULOSE ACYLATE FILM, LAMINATE, POLARIZING PLATE, AND LIQUID CRYSTAL DISPLAY DEVICE

(71) Applicant: FUJIFILM Corporation, Tokyo (JP)

(72) Inventors: Takashi Tamada, Kanagawa (JP); Koji Iijima, Kanagawa (JP); Nobuhiko Ichihara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/433,768

(22) Filed: Feb. 15, 2017

(65) Prior Publication Data

US 2017/0157900 A1 Jun. 8, 2017

Related U.S. Application Data

(63) Continuation of application No. PCT/JP2015/074376, filed on Aug. 28, 2015.

(30) Foreign Application Priority Data

Aug. 29, 2014 (JP) ................................ 2014-176582

(51) Int. Cl.
| | |
|---|---|
| B32B 23/08 | (2006.01) |
| B32B 23/20 | (2006.01) |
| G02B 5/30 | (2006.01) |
| B32B 23/16 | (2006.01) |
| B32B 27/30 | (2006.01) |
| G02F 1/1335 | (2006.01) |
| C08J 7/06 | (2006.01) |

(52) U.S. Cl.
CPC .............. *B32B 23/08* (2013.01); *B32B 23/16* (2013.01); *B32B 23/20* (2013.01); *B32B 27/306* (2013.01); *C08J 7/065* (2013.01); *G02B 5/30* (2013.01); *G02B 5/305* (2013.01); *G02F 1/133528* (2013.01); *B32B 2255/26* (2013.01); *B32B 2307/42* (2013.01); *B32B 2457/202* (2013.01); *C08J 2301/10* (2013.01); *Y10T 428/105* (2015.01)

(58) Field of Classification Search
CPC ... Y10T 428/105; C08J 7/065; C08J 2301/10; G02B 5/30; G02B 5/305; G02F 1/133528; B32B 23/08; B32B 23/16; B32B 23/20; B32B 2255/26; B32B 2307/42
See application file for complete search history.

(56) References Cited

U.S. PATENT DOCUMENTS

| | | | |
|---|---|---|---|
| 8,337,962 B2 | 12/2012 | Naito et al. | |
| 8,394,309 B2 | 3/2013 | Naito et al. | |
| 2011/0223435 A1 | 9/2011 | Naito et al. | |
| 2012/0153542 A1 | 6/2012 | Naito et al. | |
| 2013/0029122 A1* | 1/2013 | Fukagawa ................. | C08J 5/18 428/216 |
| 2013/0083274 A1* | 4/2013 | Fujiwara ................. | B32B 7/02 349/96 |
| 2013/0189449 A1* | 7/2013 | Fukagawa .............. | C09K 19/52 428/1.33 |
| 2015/0323824 A1 | 11/2015 | Hisakado et al. | |

FOREIGN PATENT DOCUMENTS

| | | |
|---|---|---|
| JP | 2000-352620 A | 12/2000 |
| JP | 2001-054936 A | 2/2001 |
| JP | 2002-317074 A | 10/2002 |
| JP | 2007-056093 A | 3/2007 |
| JP | 2012-072348 A | 4/2012 |
| JP | 2013-028755 A | 2/2013 |
| JP | 2013-076749 A | 4/2013 |
| WO | 2014/112575 A1 | 7/2014 |

OTHER PUBLICATIONS

Notification of Reasons for Refusal issued by the Japanese Patent Office dated Jul. 25, 2017 in connection with Japanese Patent Application No. 2014-176582.
International Preliminary Report on Patentability issued by WIPO dated Mar. 9, 2017, in connection with International Patent Application No. PCT/JP2015/074376.
International Search Report issued in connection with International Patent Application No. PCT/JP2015/074376 dated Nov. 24, 2015.
Written Opinion issued in connection with International Patent Application No. PCT/JP2015/074376 dated Nov. 24, 2015.
Notification of Reason for Refusal, issued by the Korean Intellectual Property Office dated Sep. 17, 2018, in connection with corresponding Korean Patent Application No. 10-2017-7002977.

* cited by examiner

*Primary Examiner* — Sophie Hon
(74) *Attorney, Agent, or Firm* — Edwards Neils LLC; Jean C. Edwards, Esq.

(57) ABSTRACT

The present invention provides a cellulose acylate film, containing: an organic acid satisfying requirements of a to c, in which a film thickness of the cellulose acylate film is greater than or equal to 3 μm, and an average concentration of the organic acid in a region from one surface of the cellulose acylate film to a depth of 0 to 0.2 μm is lower than an average concentration of the organic acid in a residual region other than the region: a: having a structure in which polyhydric alcohol and a polyvalent carboxylic acid are bonded by forming an ester bond; b: the total number of molecules of polyhydric alcohol and a monovalent or more carboxylic acid forming the organic acid being greater than or equal to 3; and c: having at least one non-substituted carboxyl group derived from a polyvalent carboxylic acid.

12 Claims, No Drawings

CELLULOSE ACYLATE FILM, MANUFACTURING METHOD OF CELLULOSE ACYLATE FILM, LAMINATE, POLARIZING PLATE, AND LIQUID CRYSTAL DISPLAY DEVICE

CROSS-REFERENCE TO RELATED APPLICATIONS

This application is a continuation of PCT International Application No. PCT/JP2015/074376 filed on Aug. 28, 2015, which was published under PCT Article 21(2) in Japanese and which claims priority under 35 U.S.C § 119 (a) to Japanese Patent Application No. 2014-176582 filed on Aug. 29, 2014. The above applications are hereby expressly incorporated by reference, in their entirety, into the present application.

BACKGROUND OF THE INVENTION

1. Field of the Invention

The present invention relates to a cellulose acylate film, a manufacturing method of a cellulose acylate film, a laminate, a polarizing plate, and a liquid crystal display device.

2. Description of the Related Art

Recently, a liquid crystal display device has been used as a television, and a high image quality and low cost have been increasingly required as a screen size becomes larger. In addition, a case of using the liquid crystal display device in the outside has increased, and durability of the liquid crystal display device under a rigorous environment has been required.

In a polarizing plate of the liquid crystal display device, it is generally known that a polarizer using polyvinyl alcohol (PVA) and iodine is sandwiched between two polarizing plate protective films, and thus, durability is improved. Various films such as a cellulose acylate film or an acrylic resin film are used as a polarizing plate protective film, and the polarizing plate protective film is required to be strong and have excellent optical properties.

In JP2013-28755A, a resin film in which 0.01 mass % to 20 mass % of an organic acid satisfying a predetermined requirement is added to a resin is disclosed as a resin film which can improve polarizer durability. In addition, in JP2012-72348A, a resin film in which 0.1 mass % to 20 mass % of an organic acid represented by a predetermined structure is added to a resin is disclosed as a resin film which can improve polarizer durability.

SUMMARY OF THE INVENTION

As described above, it is desirable that the durability of the polarizer is improved as the polarizer becomes thinner, and an additive improving the durability of the polarizer is used. Here, in a case where the added amount of the additive described above in order to further improve the durability of the polarizer, a problem such as bleed out of the additive described above occurs on a surface of a cellulose acylate film after performing a constraint aging test (for example, a test of leaving a film to stand for a long period of time under a high temperature and high humidity environment; and the like). For this reason, it is difficult to make improvement in the durability of the polarizer and suppression of the bleed out of the additive compatible.

The present invention has been made in consideration of such circumstances, and an object of the present invention is to provide a cellulose acylate film in which durability of a polarizer is improved, and bleed out of an additive for improving the durability of the polarizer is suppressed. In addition, another object of the present invention is to provide a manufacturing method of the cellulose acylate film described above, a laminate, a polarizing plate, and a liquid crystal display device.

As a result of intensive studies of the present inventors for attaining the objects described above, it has been found that in a cellulose acylate film containing an organic acid as an additive for improving durability of a polarizer, the average concentration of the organic acid in a region on one surface of the cellulose acylate film is set to be lower than the average concentration of the organic acid in a residual region, and thus, it is possible to provide a cellulose acylate film in which the objects described above are attained, and thus, the present invention has been completed. That is, according to the present invention, the followings are provided.

(1) A cellulose acylate film, containing: an organic acid satisfying requirements of a to c, in which a film thickness of the cellulose acylate film is greater than or equal to 3 μm, and an average concentration of the organic acid in a region from one surface of the cellulose acylate film to a depth of 0 to 0.2 μm is lower than an average concentration of the organic acid in a residual region other than the region.

a: Having a structure in which polyhydric alcohol and a polyvalent carboxylic acid are bonded by forming an ester bond;

b: The total number of molecules of polyhydric alcohol and a monovalent or more carboxylic acid forming the organic acid being greater than or equal to 3; and c: Having at least one non-substituted carboxyl group derived from a polyvalent carboxylic acid.

(2) The cellulose acylate film according to (1), in which greater than or equal to 80 mass % of the organic acid exists in a region from the one surface of the cellulose acylate film to ½ of a total film thickness in a depth direction.

(3) The cellulose acylate film according to (1) or (2), in which the cellulose acylate film is a single layer film, or a multilayer film formed of an inner layer and one or more outer layers.

(4) The cellulose acylate film according to any one of (1) to (3), in which the cellulose acylate film is a multilayer film formed of an inner layer and one or more outer layers, an acyl substitution degree of cellulose acylate configuring the outer layer and the inner layer of the cellulose acylate film satisfies Expression 2 described below.

DSo>DSi                        Expression 2:

In Expression 2, DSo represents an acyl substitution degree of cellulose acylate configuring the outer layer, and DSi represents an acyl substitution degree of cellulose acylate configuring the inner layer.

(5) The cellulose acylate film according to any one of (1) to (4), further containing: a compound represented by Formula 3.

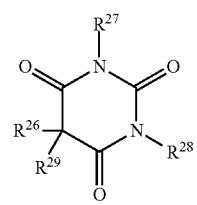

Formula 3

In Formula 3, $R^{26}$ represents an alkyl group, an alkynyl group, or an aromatic hydrocarbon group, $R^{27}$ and $R^{28}$ each independently represent a hydrogen atom, an alkyl group, an alkenyl group, an aromatic hydrocarbon group, or an aromatic heterocyclic group, $R^{29}$ represents a hydrogen atom, an alkyl group, or an aromatic hydrocarbon group, and $R^{26}$, $R^{27}$, $R^{28}$, and $R^{29}$ may each independently have a substituent.

(6) The cellulose acylate film according to any one of (1) to (5), in which the film thickness is 10 to 80 μm.

(7) A manufacturing Method of the cellulose acylate film according to any one of (1) to (6), comprising: a step of applying an organic acid satisfying requirements of a to c onto the cellulose acylate film.

a: Having a structure in which polyhydric alcohol and a polyvalent carboxylic acid are bonded by forming an ester bond;

b: The total number of molecules of polyhydric alcohol and a monovalent or more carboxylic acid forming the organic, acid being greater than or equal to 3; and c: Having at least one non-substituted carboxyl group derived from a polyvalent carboxylic acid.

(8) A laminate, comprising: the cellulose acylate film according to any one of (1) to (6); and a liquid crystal layer or a hard coat layer, in which the liquid crystal layer or the hard coat layer exists on the other surface of the cellulose acylate film on a side opposite to the one surface.

(9) A polarizing plate, comprising: a polarizer; and the cellulose acylate film according to any one of (1) to (6) or the laminate according to (8).

(10) A liquid crystal display device, comprising: the cellulose acylate film according to any one of (1) to (6), the laminate according to (8), or the polarizing plate according to (9).

According to the present invention, a cellulose acylate film in which durability of a polarizer is improved, and bleed out of an additive for improving the durability of the polarizer can be suppressed, and a manufacturing method thereof are provided. In a laminate, a polarizing plate, and a liquid crystal display device of the present invention, the durability of the polarizer is improved, and the bleed out of the additive described above is suppressed.

DESCRIPTION OF THE PREFERRED EMBODIMENTS

Hereinafter, the present invention will be described in detail. The following description is based on representative embodiments of the present invention, but the present invention is not limited to the embodiments. Furthermore, herein, a numerical, range represented by using "to" indicates a range including numerical values before and after "to" as the lower limit value and the upper limit value. In addition, in an angle, "vertical" and "orthogonal" indicate a range of 90°±10°. Furthermore, solid contents indicate solid contents at 25° C.

Herein, Re (λ) and Rth (λ) each represent in-plane retardation (nm) and retardation (nm) in a thickness direction at a wavelength of λ. Furthermore, herein, unless otherwise particularly stated, the wavelength of λ is 550 nm. Re (λ) is measured by allowing light at a wavelength of λ nm to be incident in a film normal direction, and by using KOBRA 21ADH, WR, or KOBRA CCD series (manufactured by Oji Scientific Instruments).

In a case where a film to be measured is represented by a uniaxial index ellipsoid or a biaxial index ellipsoid, Rth (λ) is calculated by the following method.

In Rth (λ), Re (λ) described above is measured at 6 points in total by allowing light at a wavelength of λ nm to be incident from directions respectively tilted in a 10 degrees-step from a normal direction to 50° on one side with respect to the film normal direction in which an in-plane slow axis (determined by KOBRA 21ADH, WR or KOBRA CCD series) is used as a tilt axis (a rotation axis) (in a case where there is no slow axis, an arbitrary direction of a film plane is used as the rotation axis), and Rth (λ) is calculated by KOBRA 21ADH, WR, or KOBRA CCD series on the basis of the measured retardation value, an assumed value of the average refractive index, and an input film thickness value.

In the above description, in a case of a film having a direction in which a retardation value at a certain tilt angle is zero by using the in-plane slow axis as the rotation axis from the normal direction, a retardation value at a tilt angle greater than the tilt angle described above is changed to have a negative sign, and then, Rth (λ) is calculated by KOBRA 21ADH, WR, or KOBRA CCD series. In selection of a measurement wavelength of λ nm, a wavelength selective filter can be manually exchanged, or measurement can be performed by converting the measured value with a program or the like.

Furthermore, a retardation value is measured from two arbitrarily tilted directions by using the slow axis as the tilt axis (the rotation axis) (in a case where there is no slow axis, an arbitrary direction of the film plane is used as the rotation axis), and Rth can be calculated by Expression (X) described below and Expression (XI) described below on the basis of the retardation value, an assumed value of the average refractive index, and the input film thickness value.

Expression (X)
$$Re(\theta) = \left[ nx - \frac{ny \times nz}{\sqrt{\left(ny \sin\left(\sin^{-1}\left(\frac{\sin(-\theta)}{nx}\right)\right)\right)^2 + \left(nz \cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)}$$

Expression (XI)
$$Rth = \{(nx + ny)/2 - nz\} \times d$$

Re(θ) described above indicates a retardation value in a direction tilted by an angle of θ from the normal direction. In addition, in the expression, nx represents a refractive index in a slow axis direction in the plane, ny represents a refractive index in a direction orthogonal to nx in the plane, and nz represents a refractive index in a direction orthogonal to nx and ny. d represents a film thickness.

In a case where the film to be measured is a so-called film not having an optic axis which cannot be represented by a uniaxial index ellipsoid or a biaxial index ellipsoid, Rth (λ) is calculated by the following method.

In Rth (λ), Re (λ) described above is measured at 11 points by allowing light at a wavelength of λ nm to be incident from directions respectively inclined in a 10 degrees-step from −50° to +50° with respect to the film normal direction in which the in-plane slow axis (determined by KOBRA 21ADH, WR, or KOBRA CCD series) is used as the tilt axis (the rotation axis), and Rth (λ) is calculated by KOBRA 21ADH or WR on the basis of the measured retardation value, an assumed value of the average refractive index, and an input film thickness value.

In addition, in the measurement described above, a catalog value of various optical films in a polymer handbook (JOHN WILEY&SONS, INC) can be used as the assumed value of the average refractive index. In a case where the value of the average refractive index is not known in advance, the value of the average refractive index can be measured by using an ABBE'S REFRACTOMETER. The value of the average refractive index of a main optical film will be exemplified as follows:

Cellulose acylate (1.48), a cycloolefin polymer (1.52), polycarbonate (1.59), polymethyl methacrylate (1.49), and polystyrene (1.59).

The assumed values of the average refractive index and the film thickness are input, and thus, nx, ny, and nz are calculated by KOBRA WR, or KOBRA CCD series. Nz=(nx−nz)/(nx−ny) is further calculated by the calculated nx, ny, and nz.

Furthermore, the retardation can be measured by using AXOSCAN (manufactured by Axornetries, Inc.).

In the present invention, a "slow axis" of a phase difference film or the like indicates a direction in which a refractive index is maximized. In addition, unless otherwise particularly stated, a measurement wavelength of the refractive index is a value at λ of 550 nm in a visible light range.

Herein, a weight-average molecular weight and a number average molecular weight are defined as a polystyrene conversion value of gel permeation chromatography (GPC) measurement. Herein, the weight-average molecular weight and the number average molecular weight (Mn), for example, can be obtained by using HLC-8220 (manufactured by TOSOH CORPORATION), and by using TSKgel (Registered Trademark) Super AWM-H (manufactured by TOSOH CORPORATION, 6.0 mmID×15.0 cm) as a column. Unless otherwise particularly stated, an eluant is measured by using 10 mmol/L of a solution of lithium bromide N-methyl pyrrolidinone (NMP).

<Cellulose Acylate Film>

A cellulose acylate film of the present invention (hereinafter, also referred to as a film of the present invention) contains an organic acid satisfying requirements a to c described below, a film thickness is greater than or equal to 3 μm, and the average concentration of the organic acid in a region from one surface of the cellulose acylate film to a depth of 0 to 0.2 μm is lower than the average concentration of the organic acid in a residual region other than the region. The cellulose acylate film in the present invention indicates a film containing cellulose acylate, and may contain components other than the cellulose acylate.

As a result of studies of the present inventors, it has been found that in a case where the organic acid is added to the entire cellulose acylate film which is a single layer, or the organic acid is added to an inner layer in a case where the cellulose acylate film is a multilayer including the inner layer and one or more outer layers, the concentration of the organic acid in a depth direction of the cellulose acylate film is approximately homogeneously distributed. In addition, in a case where the added amount of the organic acid increases in order to improve durability of a polarizer, bleed out of the organic acid occurs, and thus, it is difficult to make improvement in the durability and prevention of the bleed out compatible.

In the present invention, the organic acid is in homogeneously distributed in the cellulose acylate film, and thus, it is possible to improve the durability of the polarizer even in a case where a small amount of the organic acid is added. In addition, in the present invention, by setting the average concentration of the organic acid in the region from one surface of the cellulose acylate film to the depth of 0 to 0.2 μm to be lower than the average concentration of the organic acid in the residual region other than the region, that is, by setting the concentration of the organic acid in the region from one surface to the depth of 0 to 0.2 μm to be lower than the concentration of the organic acid in a region other than the region described above, it is possible to suppress the bleed out of the organic acid. As described above, according to the configuration of the present invention, it is possible to make improvement in the durability of the polarizer and suppression of the bleed out of the organic acid compatible.

The average concentration of the organic acid in the region from one surface of the cellulose acylate film to the depth of 0 to 0.2 μm and the average concentration of the organic acid in the residual region other than the region described above can be measured by the following method. A film is cut at a tilt with respect to a film surface by an angle of 1°, and a film cross section is subjected to mapping measurement by using a time-of-flight secondary ion mass spectrometer (TOF-SIMS). In negative measurement, an abundance ratio of the organic acids existing in the depth of less than or equal to 0.2 μm from the surface is obtained from a ratio of a peak surface area value of molecule-H+ ion in a portion corresponding to a depth of less than or equal to 0.2 μm from the surface and a peak surface area value of the entire film An abundance ratio of the organic acids in a depth of greater than or equal to 0.2 μm (to an opposite surface) is also obtained by the same method. The average concentration of the organic acid in the depth of less than or equal to 0.2 μm from the surface is obtained from the abundance ratio of the organic acids and the amount of organic acid which is added. In addition, the average concentration of the organic acid in the region from the surface to the depth of less than or equal to 0.2 μm is calculated from the amount of organic acid and the amount of components other than the organic acid in the depth of less than or equal to 0.2 μm from the surface in the film. The average concentration of the organic acid in the depth of greater than or equal to 0.2 μm (to the opposite surface) can also be obtained by the same method.

The average concentration of the organic acid in the region from one surface to the depth of 0 to 0.2 μm may be lower than the average concentration of the organic acid in the residual region other than the region described above, the values of the average concentrations in each of the regions and a difference thereof are not particularly limited. The average concentration of the organic acid in the region from one surface to the depth of 0 to 0.2 μm is preferably 0.01 to 0.6 mass %, is more preferably 0.01 to 0.5 mass %, and is even more preferably 0.01 to 0.35 mass %. In general, the average concentration of the organic acid in the residual region described above is preferably greater than 0.5 mass %, and is more preferably greater than or equal to 0.8 mass %, and the upper limit is not particularly limited, but is preferably less than or equal to 2 mass %. A difference in the values of the average concentrations in each of the regions is not particularly limited, but is preferably 0.1 to 2 mass %, is more preferably 0.5 to 2 mass %, and is particularly preferably 0.3 mass % to 1 mass %.

A film thickness of the cellulose acylate film is greater than or equal to 3 μm, is preferably 10 to 80 μm, is more preferably 10 to 60 μm, is even more preferably 20 to 60 μm, and is particularly preferably 30 to 50 μm.

Furthermore, the film thickness is obtained by using a contact type film thickness measuring meter (manufactured by ANRITSU), and in order to inquire the average thickness of the film, measurement in all points at a pitch of 20 mm in a width direction of a measured film is repeated 5 times at a pitch of 100 mm in a machine direction, and thus, it is possible to obtain the thickness of the film by the average value of all measured values.

In the present invention, it is preferable that greater than or equal to 80 mass % of the organic acid described above exists in a region from one surface of the cellulose acylate film to ½ of the total film thickness in the depth direction (that is, a region from the one surface described above to a depth of 50% of the total film thickness in the depth direction). According to such a configuration, it is possible to effectively suppress the bleed out of the organic acid described above.

The cellulose acylate film of the present invention may be a single layer film or a multilayer film formed of an inner layer and one or more outer layers. The configuration of the multilayer film may be a film formed of two layers of an inner layer and an outer layer on the surface of the inner layer or may be a film formed of three layers of an inner layer and outer layers respectively existing on both surfaces of the inner layer (that is, the outer layer/the inner layer/the outer layer).

In a case where the cellulose acylate film is the multilayer film formed of the inner layer and one or more outer layers, it is preferable that an acyl substitution degree of cellulose acylate configuring the outer layer and the inner layer of the cellulose acylate film satisfies Expression 2 described below.

DSo>DSi                              Expression 2:

In Expression 2, DSo represents an acyl substitution degree of cellulose acylate configuring the outer layer, and DSi represents an acyl substitution degree of cellulose acylate configuring the inner layer.

According to such a configuration, it is easy to set the average concentration of the organic acid in the region from one surface of the cellulose acylate film to the depth of 0 to 0.2 μm described above to be lower than the average concentration of the organic acid in the residual region other than the region described above.

<<Cellulose Acylate>>

Examples of cellulose of an acylate raw material include cotton linters, wood pulp (hardwood pulp and softwood pulp), and the like, cellulose acylate which can be obtained from any raw material cellulose, and two or more types of cellulose acylates may be used by being mixed. For example, cellulose described in "Plastic Material Course (17) Cellulose-Based Resin" which is written by MARU-SAWA and UDA and published by NIKKAN KOGYO SHIMBUN, LTD. (in 1970) or Journal of Technical Disclosure Vol. 2001-1745 of Japan Institute for Promoting Invention and Innovation (p. 7 and p. 8) can be used as the detailed description of the raw material cellulose.

Only one type of acyl group may be used in the film of the present invention, or two or more types of the acyl groups may be used. It is preferable that the film of the present invention has an acyl group having 2 to 4 carbon atoms as a substituent. When two or more types of the acyl groups are used, it is preferable that one of the acyl groups is an acetyl group, and a propionyl group or a butyryl group is preferable as the acyl group having 2 to 4 carbon atoms.

A glucose unit having a β-1,4 bond which configures cellulose has a free hydroxyl group in a 2-position, a 3-position, and a 6-position. Cellulose acylate is a polymer in which a part or all of the hydroxyl group is acylated by an acyl group. An acyl substitution degree indicates the total of a ratio (acylation of 100% in each position is Substitution Degree 1) in which a hydroxyl group of cellulose positioned in a 2-position, a 3-position, and a 6-position is acylated.

The total acyl substitution degree of the cellulose acylate is preferably 1.0 to 2.97, is more preferably 1.5 to 2.9, and is even more preferably 1.5 to 2.6. In a case where the film of the present invention is the multilayer film formed of the inner layer and one or more outer layer, the acyl substitution degree of the cellulose acylate of the inner layer is preferably 1.5 to 2.9, is more preferably 1.5 to 2.55, is even more preferably 2.0 to 2.55, and is particularly preferably 2.3 to 2.55, The acyl substitution degree of the cellulose acylate of the outer layer is preferably 1.5 to 2.97, is more preferably 2.0 to 2.97 is even more preferably 2.6 to 2.97, and is particularly preferably 2.7 to 2.97.

The acyl substitution degree can be measured by a method described in paragraph 0026 of JP1996-231761A (JP-H08-231761A). The details are as described below.

1.9 g of dried cellulose acylate is weighed, 70 ml of acetone and 30 ml of dimethyl sulfoxide are added and dissolved, and then, 50 ml of acetone is added 30 ml of an aqueous solution of sodium hydroxide of 1 N (1 mol/L) is added while being stirred, and is saponified for 2 hours. 100 ml of hot water is added, and a side surface of a flask is washed, and then, a sulfuric acid of 1 N (0.5 mol/L) is titrated by using phenolphthalein as an indicator. Separately, a blank test is performed by the same method as that of a sample. A supernatant solution of a solution of which the titration has ended is diluted 100 times, and a composition of an organic acid is measured by using an ion chromatography and by an ordinary method. A substitution degree is calculated by the following expression from a measurement result and an acid composition analysis result of the ion chromatography.

$TA=(B-A)\times F/(1000\times W)$ $DSace=(162.14\times TA)/\{1-42.14\times TA+(1-56.06\times TA)\times (AL/AC)\}$ $DSacy=Sace\times (AL/AC)$ A: Titration Amount of Sample (nil)
B: Titration Amount of Blank Test (m1)
F: Titer of Sulfuric Acid of 1 N (0.5 mol/L)
W: Mass of Sample (g)
TA: Total Amount of Organic Acid (mol/g)
AL/AC: Molar Ratio of Acetic Acid (AC) and Other Organic Acids (AL) Measured by Ion Chromatography
DSace: Substitution Degree of Acetyl Group
DSacy: Substitution Degree of Other Acyl Groups The acyl group having greater than or equal to 2 carbon atoms of the cellulose acylate may be an aliphatic group or may be an allyl group, and is not particularly limited. Examples of the acyl group having greater than or equal to 2 carbon atoms include alkyl carbonyl ester of cellulose, alkenyl carbonyl ester, aromatic carbonyl ester, aromatic alkyl carbonyl ester, and the like, and each of them may have a group which is further substituted. Preferred examples thereof can include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an isobutanoyl group, a tert-butanoyl group, a cyclohexane carbonyl group, an oleoyl group, a benzoyl group, a naphthyl carbonyl group, a cinnamoyl group, and the like. Among them, the acetyl group, the propionyl group, the butanoyl group, the dodecanoyl group, the octadecanoyl group, the tert-butanoyl group, the oleoyl group, the benzoyl group, the naphthyl carbonyl group, the cinnamoyl group, and the like are more preferable, the acetyl group, the propionyl group, and the butanoyl group (in a case where the acyl group has 2 to 4 carbon atoms) are particularly preferable, and the acetyl group (in a case where the cellulose acylate is cellulose acetate) is more particularly preferable.

In acylation of cellulose, in a case where ail acid anhydride or an acid chloride is used as an acylation agent, an organic acid, for example, an acetic acid, methylene chloride, and the like are used as an organic solvent which is a reaction solvent.

In a case where the acylation agent is the acid anhydride, a protic catalyst such as a sulfuric acid is preferably used as a catalyst, and in a case where the acylation agent is the acid chloride (for example, $CH_3CH_2COCl$), a basic compound is used as the catalyst.

An industrial synthesis method of a mixed fatty acid ester of general cellulose is a method in which cellulose is acylated by a mixed organic acid component containing an acetyl group and a fatty acid corresponding to the other acyl group (an acetic acid, a propionic acid, a valeric acid, and the like) or an acid anhydride thereof.

The cellulose acylate, for example, can be synthesized by a method described in JP1998-45804A (JP-H10-45804A).

It is preferable that the film of the present invention contains 10 to 99 mass % of the cellulose acylate, it is more preferable that the film contains 20 to 99 mass % of the cellulose acylate, and it is particularly preferable that the film contains 50 to 95 mass % of the cellulose acylate.

<<Organic Acid Satisfying Requirements of a to c>>

The film of the present invention contains the organic acid satisfying the requirements a to c.

a: Having a structure in which polyhydric alcohol and a polyvalent carboxylic acid are bonded by forming an ester bond;

b: The total number of molecules of polyhydric alcohol and a monovalent or more carboxylic acid forming the organic acid being greater than or equal to 3; and c: Having at least one non-substituted carboxyl group derived from a polyvalent carboxylic acid.

A molecular weight of a polyvalent carboxylic acid used in the organic acid satisfying the requirements of a to c is preferably 50 to 350, and is more preferably 100 to 250. The number of carboxyl groups per one molecule of the polyvalent carboxylic acid may be greater than or equal to 2, and is preferably 2 to 3.

The polyvalent carboxylic acid may be an aliphatic polyvalent carboxylic acid or may be an aromatic polyvalent carboxylic acid, and the aliphatic polyvalent carboxylic acid is preferable. The polyvalent carboxylic acid may be any one of a linear polyvalent carboxylic acid, a branched polyvalent carboxylic acid, and a cyclic polyvalent carboxylic acid, and may be any one of a saturated polyvalent carboxylic acid and an unsaturated polyvalent carboxylic acid. In addition, the polyvalent carboxylic acid may have a functional group other than the carboxyl group, and for example, may have one or more hydroxyl groups and one or more acyl groups such as an acetyl group in the molecules.

For example, a succinic acid, a citric acid, a tartaric acid, a diacetyl tartaric acid, a malic acid, and an adipic acid are preferable as the polyvalent carboxylic acid. In the organic acid satisfying requirements of a to c, the number of molecules of the polyvalent carboxylic acid is preferably 1 to 20, is more preferably 1 to 15, and is particularly preferably 1 to 10.

In addition, polyhydric alcohol used in the organic acid satisfying the requirements of a to c is not particularly limited insofar as the polyhydric alcohol is a compound having two or more hydroxyl groups in one molecule.

A molecular weight of the polyhydric alcohol is preferably 50 to 300, and is more preferably 50 to 150. The number of hydroxyl groups per one molecule of the polyhydric alcohol may be greater than or equal to 2, is preferably 2 to 6, and is more preferably 2 to 4, The polyhydric alcohol may be aliphatic polyhydric alcohol or may be aromatic polyhydric alcohol, and the aliphatic polyhydric alcohol is preferable. The polyhydric alcohol may be any one of linear polyhydric alcohol, branched polyhydric alcohol, or cyclic polyhydric alcohol, and may be any one of saturated polyhydric alcohol and unsaturated polyhydric alcohol. Examples of the polyhydric alcohol can include adonitol, arabitol, ethylene glycol, diethylene glycol, triethylene glycol, tetraethylene glycol, 1,2-propane diol, 1,3-butane diol, 1,4-butane diol, dibutylene glycol, 1,2,4-butane triol, 1,5-pentane diol, 1,6-hexane diol, hexane triol, galactitol, mannitol, 3-methyl pentane-1,3,5-triol, pinacol, sorbitol, trimethylol propane, trimethylol ethane, xylitol, glycerin, and the like. Among them, the glycerin is preferable.

In the organic acid satisfying the requirements of a to c, the number of molecules of the polyhydric alcohol is preferably 1 to 20, is more preferably 1 to 15, and is particularly preferably 1 to 10.

The organic acid satisfying the requirements of a to c may have a structure in which a monovalent acid having a substituent having greater than or equal to 4 carbon atoms further forms an ester bond with a hydroxyl group of a part of the polyhydric alcohol in addition to the polyhydric alcohol and the polyvalent carboxylic acid configuring the organic acid.

A molecular weight of the monovalent acid having the substituent having greater than or equal to 4 carbon atoms is preferably 50 to 500, and is more preferably 200 to 400.

The monovalent acid having the substituent having greater than or equal to 4 carbon atoms may be an aliphatic acid or may be an aromatic acid, and the aliphatic acid is preferable. The monovalent acid having the substituent having greater than or equal to 4 carbon atoms may be any one of a linear monovalent acid, a branched monovalent acid, and a cyclic monovalent acid, and may be any one of a saturated monovalent acid and an unsaturated monovalent acid.

The number of carbon atoms of the monovalent acid having the substituent having greater than or equal to 4 carbon atoms is preferably greater than or equal to 5, and is more preferably greater than or equal to 10.

Specific examples of the monovalent acid having the substituent having greater than or equal to 4 carbon atoms include the followings. Furthermore, the substituent in the monovalent acid having the substituent having greater than or equal to 4 carbon atoms indicates R when the monovalent acid having the substituent having greater than or equal to 4 carbon atoms is represented by RCOOH.

<<<Carboxylic Acid (Fatty Acid)>>>

A caproic acid, a hepthylic acid, a caprylic acid, a pelargonic acid, a lauric acid, a myristic acid, a palmitic acid, a stearic acid, an oleic acid, a linolic acid, a linoleic acid, a ricinoleic acid, and an undecanoic acid.

<<<Alkyl Sulfuric Acid>>>

A myristyl sulfuric acid, a cetyl sulfuric acid, and an oleyl sulfuric acid.

<<<Alkyl Benzene Sulfonic Acid>>>

A dodecyl benzene sulfonic acid and a pentadecyl benzene sulfonic acid.

<<<Alkyl Naphthalene Sulfonic Acid>>>

A sesquibutyl naphthalene sulfonic acid and a diisobutyl naphthalene sulfonic acid.

Among them, a monovalent carboxylic acid having the substituent having greater than or equal to 4 carbon atoms which is a fatty acid is preferable, the caprylic acid, the lauric acid, the stearic acid, and the oleic acid are more preferable, and the oleic acid is particularly preferable.

In the organic acid satisfying the requirements of a to c, the number of molecules of the monovalent acid having the substituent having greater than or equal to 4 carbon atoms is preferably 0 to 4, is more preferably 0 to 3, and is particularly preferably 0 to 2.

In the organic acid satisfying the requirements of a to c, the total number of molecules of the polyhydric alcohol and the monovalent or more carboxylic acid forming the organic acid is greater than or equal to 3, is preferably 3 to 30, and is more preferably 3 to 20.

In the organic acid satisfying the requirements of a to c, a ratio of the polyvalent carboxylic acid, the polyhydric alcohol, and the monovalent acid having the substituent having greater than or equal to 4 carbon atoms is not particularly limited; and two or more non-substituted hydroxyl groups may remain in the organic acid, or the non-substituted hydroxyl group may not remain.

The organic acid satisfying the requirements of a to c has at least one non-substituted carboxyl group derived from the polyvalent carboxylic acid, preferably has 1 to 40 non-substituted carboxyl groups derived from the polyvalent carboxylic acid, and more preferably has 1 to 30 non-substituted carboxyl groups derived from the polyvalent carboxylic acid.

The organic acid satisfying the requirements of a to c may be independently used, or may be used as a plurality of mixtures. Furthermore, the organic acid satisfying the requirements of a to c may be ionized, and may form a salt with an arbitrary metal ion or the like.

Hereinafter, preferred compound examples of the organic acid satisfying the requirements of a to c will be described. An organic acid (a partial condensate of an organic acid) formed of the following compositions is preferable. The numerical values in the tale indicates each number of molecules in one molecule of an organic acid. A condensate formed of one molecule of glycerin, one molecule of a citric acid, and one molecule of an oleic acid is particularly preferable.

TABLE 1

| Organic Acid | Polyhydric Alcohol Glycerin | Polyvalent Carboxylic Acid Citric Acid | Monovalent Acid Having Substituent Having greater than or equal to 4 Carbon Atoms Oleic Acid |
|---|---|---|---|
| Condensate A-1 | 1 to 3 | 1 and 2 | 0 and 1 |
| Condensate A-2 | 1 to 3 | 1 and 2 | 1 and 2 |
| Condensate A-3 | 1 to 4 | 2 and 3 | 0 and 1 |
| Condensate A-4 | 1 to 4 | 2 and 3 | 1 and 2 |
| Condensate A-5 | 5 and 6 | 3 and 4 | 1 and 2 |
| Condensate A-6 | 7 and 8 | 3 and 4 | 1 and 2 |

TABLE 2

| Organic Acid | Polyhydric Alcohol Glycerin | Polyvalent Carboxylic Acid Citric Acid | Monovalent Acid Having Substituent Having greater than or equal to 4 Carbon Atoms Caprylic Acid |
|---|---|---|---|
| Condensate B-1 | 2 and 3 | 1 and 2 | 0 and 1 |
| Condensate B-2 | 2 and 3 | 1 and 2 | 1 and 2 |
| Condensate B-3 | 2 to 4 | 2 and 3 | 0 and 1 |
| Condensate B-4 | 2 to 4 | 2 and 3 | 1 and 2 |
| Condensate B-5 | 5 and 6 | 3 and 4 | 1 and 2 |
| Condensate B-6 | 7 and 8 | 3 and 4 | 1 and 2 |

TABLE 3

| Organic Acid | Polyhydric Alcohol Glycerin | Polyvalent Carboxylic Acid Citric Acid | Monovalent Acid Having Substituent Having greater than or equal to 4 Carbon Atoms Lauric Acid |
|---|---|---|---|
| Condensate C-1 | 2 and 3 | 1 and 2 | 0 and 1 |
| Condensate C-2 | 2 and 3 | 1 and 2 | 1 and 2 |
| Condensate C-3 | 2 to 4 | 2 and 3 | 0 and 1 |
| Condensate C-4 | 2 to 4 | 2 and 3 | 1 and 2 |
| Condensate C-5 | 5 and 6 | 3 and 4 | 1 and 2 |
| Condensate C-6 | 7 and 8 | 3 and 4 | 1 and 2 |

TABLE 4

| Organic Acid | Polyhydric Alcohol Glycerin | Polyvalent Carboxylic Acid Citric Acid | Monovalent Acid Having Substituent Having greater than or equal to 4 Carbon Atoms Stearic Acid |
|---|---|---|---|
| Condensate D-1 | 2 and 3 | 1 and 2 | 0 and 1 |
| Condensate D-2 | 2 and 3 | 1 and 2 | 1 and 2 |
| Condensate D-3 | 2 to 4 | 2 and 3 | 0 and 1 |
| Condensate D-4 | 2 to 4 | 2 and 3 | 1 and 2 |
| Condensate D-5 | 5 and 6 | 3 and 4 | 1 and 2 |
| Condensate D-6 | 7 and 8 | 3 and 4 | 1 and 2 |

It is preferable that an acid value of the organic acid satisfying the requirements of a to c is 45 to 65 mgKOH/g. The acid value of the organic acid indicates a value measured by "JIS K 2501-2003 Standard Test Method for Acid Number of Petroleum Products".

The content of the organic acid satisfying the requirements of a to c in the cellulose acylate film is preferably 0.01 to 20 parts by mass, and is more preferably 0.1 to 5 parts by mass, with respect to 100 parts by mass of the cellulose acylate. By setting the content of the organic acid to be greater than or equal to 0.01 parts by mass, it is possible to further improve the durability of the polarizer, and by setting the content of the organic acid to be less than or equal to 20 parts by mass, it is possible to more effectively suppress the bleed out of the organic acid in high temperature and high humidity aging.

<<Other Components>>

The cellulose acylate film of the present invention may contain one type or more selected from a compound represented by Formula 3 described below, polycondensation ester, a retardation increasing agent, and fine particles as the other components.

<<<Compound Represented by Formula 3>>>

It is preferable that the cellulose acylate film contains the compound represented by Formula 3 described below. One type of the compound represented by Formula 3 may be independently used, or two or more types thereof may be used together.

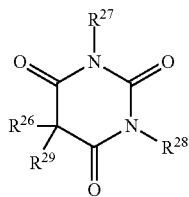

Formula 3

In Formula 3, $R^{26}$ represents an alkyl group, an alkynyl group, or an aromatic hydrocarbon group, $R^{27}$ and $R^{28}$ each independently represent a hydrogen atom, an alkyl group, an alkenyl group, an aromatic hydrocarbon group, or an aromatic heterocyclic group, $R^{29}$ represents a hydrogen atom, an alkyl group, or an aromatic hydrocarbon group, and $R^{26}$, $R^{27}$, $R^{28}$, and $R^{29}$ may each independently have a substituent.

In Formula 3, the alkyl group may be any one of a linear alkyl group, a branched alkyl group, and a cyclic alkyl group. The number of carbon atoms of the linear alkyl group is preferably 1 to 20, is more preferably 1 to 10, is even more preferably 1 to 5, and is particularly preferably 1 to 3. A methyl group or an ethyl group is preferable as the linear alkyl group. The number of carbon atoms of the branched alkyl group is preferably 3 to 20, is more preferably 3 to 10, and is even more preferably 3 to 5. The number of carbon atoms of the cyclic alkyl group is preferably 3 to 20, is more preferably 3 to 10, is even more preferably 4 to 8, and is particularly preferably 5 or 6. Examples of the cyclic alkyl group include cyclopropyl, cyclopentyl, and cyclohexyl, and the cyclohexyl is particularly preferable.

In Formula 3, the number of carbon atoms of the alkynyl group is preferably 2 to 20, is more preferably 2 to 10, and is even more preferably 2 to 5.

In Formula 3, the number of carbon atoms of the aromatic hydrocarbon group is preferably 6 to 20, is more preferably 6 to 16, and is even more preferably 6 to 12. The aromatic hydrocarbon group may be a monocyclic aromatic hydrocarbon group, or may be a polycyclic aromatic hydrocarbon group. Examples of the aromatic hydrocarbon group include a phenyl group, a naphthyl group, and the like, and the phenyl group is preferable.

In Formula 3, the number of carbon atoms of the alkenyl group is preferably 2 to 20, is more preferably 2 to 10, and is even more preferably 2 to 5. Examples of the alkenyl group include vinyl and allyl.

In Formula 3, the number of carbon atoms of the aromatic heterocyclic group is preferably 6 to 20, is more preferably 6 to 16, and is even more preferably 6 to 12, The aromatic heterocyclic group may be a monocyclic aromatic heterocyclic group, or may be a polycyclic aromatic heterocyclic group.

$R^{26}$, $R^{27}$, $R^{28}$, and $R^{29}$ may each independently have a substituent. The substituent is not particularly limited, and examples of the substituent include a linear alkyl group, a branched alkyl group, or a cyclic alkyl group (preferably, an alkyl group having 1 to 10 carbon atoms), an alkenyl group (preferably, an alkenyl group having 2 to 20 carbon atoms), an alkynyl group (preferably, an alkynyl group having 2 to 20 carbon atoms), an aryl group (preferably, an aryl group having 6 to 26 carbon atoms), a heterocyclic group, an alkoxy group (preferably, an alkoxy group having 1 to 20 carbon atoms), an aryloxy group (preferably, an aryloxy group having 6 to 26 carbon atoms), an alkyl thio group (preferably, an alkyl thio group having 1 to 20 carbon atoms), an aryl thio group (preferably, an aryl thio group having 6 to 26 carbon atoms), a sulfonyl group (preferably, a sulfonyl group having 1 to 20 carbon atoms), an acyl group (preferably, an acyl group having less than or equal to 20 carbon atoms), an alkoxy carbonyl group (preferably, an alkoxy carbonyl group having 2 to 20 carbon atoms), an aryloxy carbonyl group (preferably, an aryloxy carbonyl group having 7 to 20 carbon atoms), an amino group (preferably, an amino group having 0 to 20 carbon atoms), a sulfone amido group (preferably, a sulfone amido group having 0 to 20 carbon atoms), a sulfamoyl group (preferably, a sulfamoyl group having 0 to 20 carbon atoms), an acyloxy group (preferably, au acyloxy group having 1 to 20 carbon atoms), a carbamoyl group (preferably, a carbamoyl group having 1 to 20 carbon atoms), an acyl amino group (preferably, an acyl amino group having 1 to 20 carbon atoms), a cyano group, a hydroxyl group, a mercapto group, a carboxyl group, a halogen atom, and the like. The substituents described above may be further substituted with the substituents described above.

In the compound represented by Formula 3, it is preferable that any one of $R^{26}$, $R^{27}$, $R^{28}$, and $R^{29}$ is an alkyl group in which a group having a ring structure is substituted. Among them, it is preferable that $R^{26}$ or $R^{29}$ is an alkyl group in which a group having a ring structure is substituted. Here, it is preferable that a ring of the group having a ring structure is a benzene ring, a naphthalene ring, a cyclopentane ring, a cyclohexane ring, and a nitrogen-containing a heteroaromatic ring (for example, a pyrrole ring, a pyrazole ring, an imidazole ring, an oxazole ring, a thiazole ring, a pyridine ring, an indole ring, and an isoindole ring). In addition, in the compound represented by Formula 3, at least two of $R^{26}$, $R^{27}$, $R^{28}$, or $R^{29}$ are alkyl groups having a ring structure as a substituent. Further, it is preferable that $R^{26}$ and $R^{27}$ are each independently an alkyl group or an aromatic group. In the compound represented by Formula 3, it is preferable that the total of the ring structures existing in the substituents of $R^{26}$, $R^{27}$, $R^{28}$, and $R^{29}$ is less than or equal to 4.

A molecular weight of the compound represented by Formula 3 is preferably 250 to 1,200, is more preferably 300 to 800, and is even more preferably 350 to 600.

Hereinafter, specific examples of the compound represented by Formula 3 will be described, but the compound represented by Formula 3 is not limited thereto.

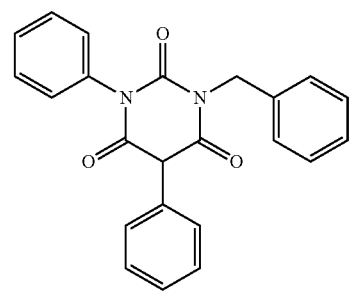

A-1

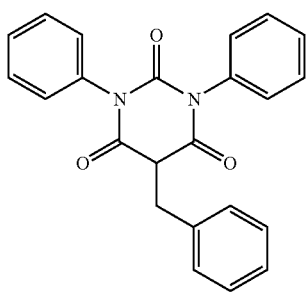
A-2
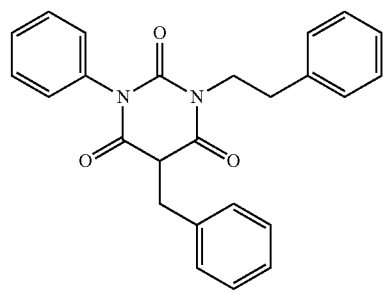
A-7
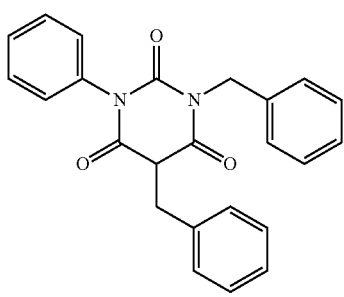
A-3
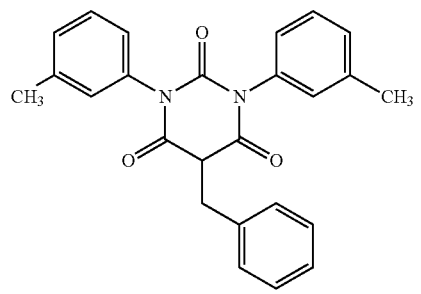
A-8
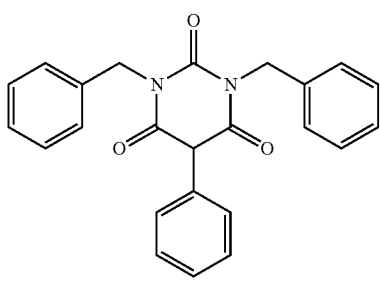
A-4
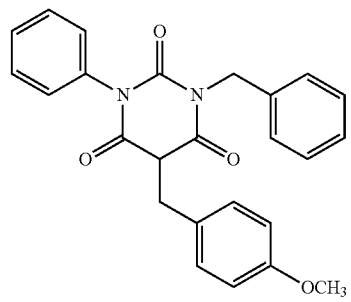
A-9
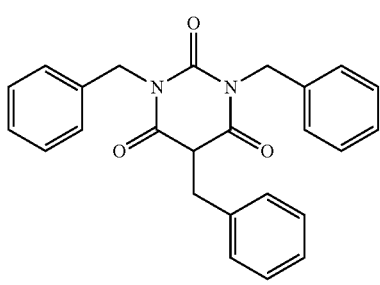
A-5
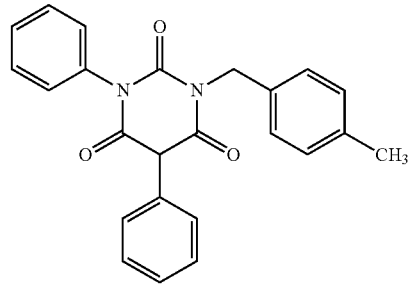
A-10
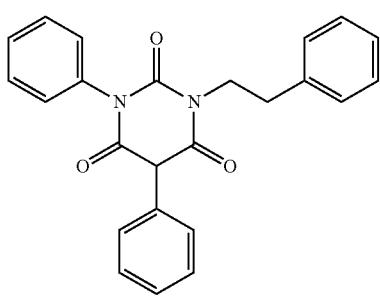
A-6
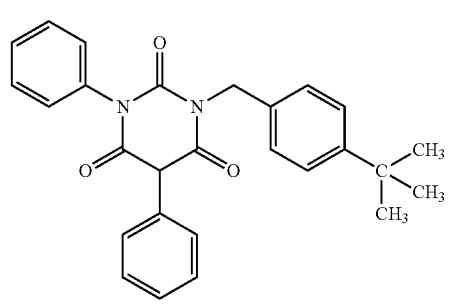
A-11

-continued
A-12
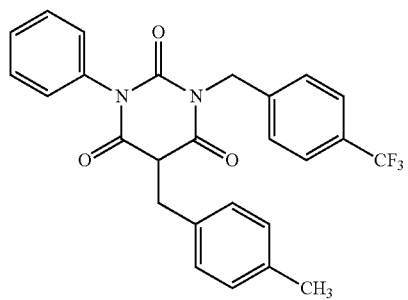
A-13
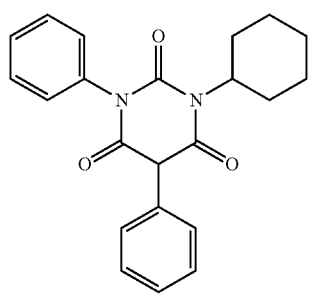
A-14
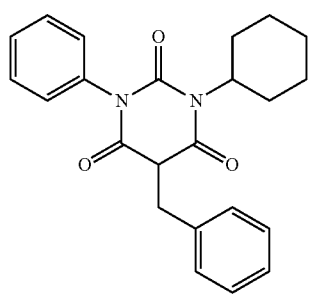
A-15
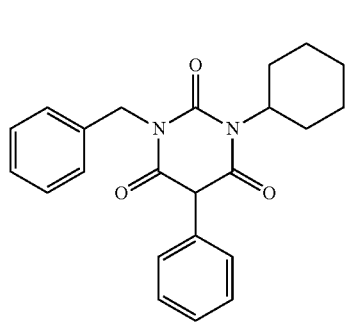
A-16
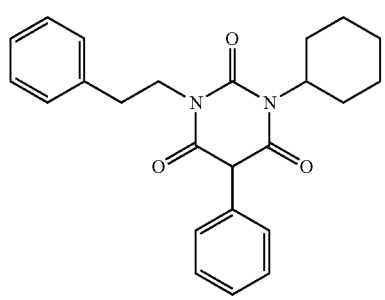
-continued
A-17
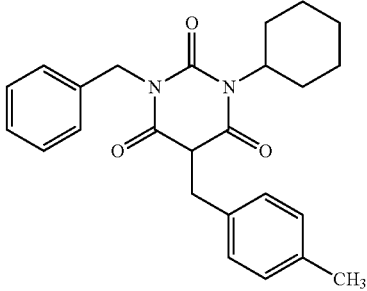
A-18
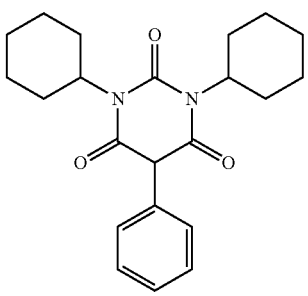
A-19
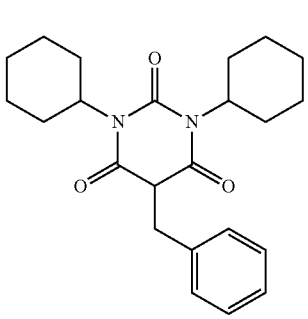
A-20
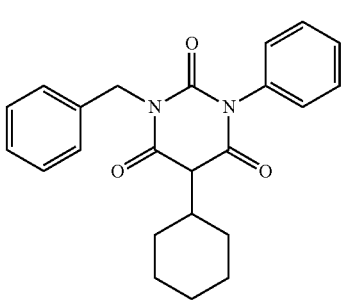
A-21
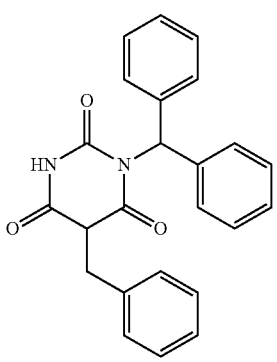

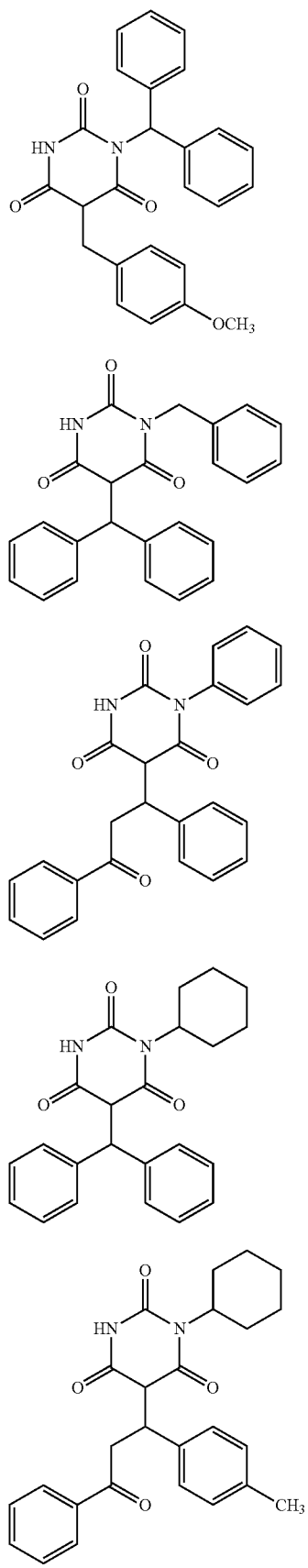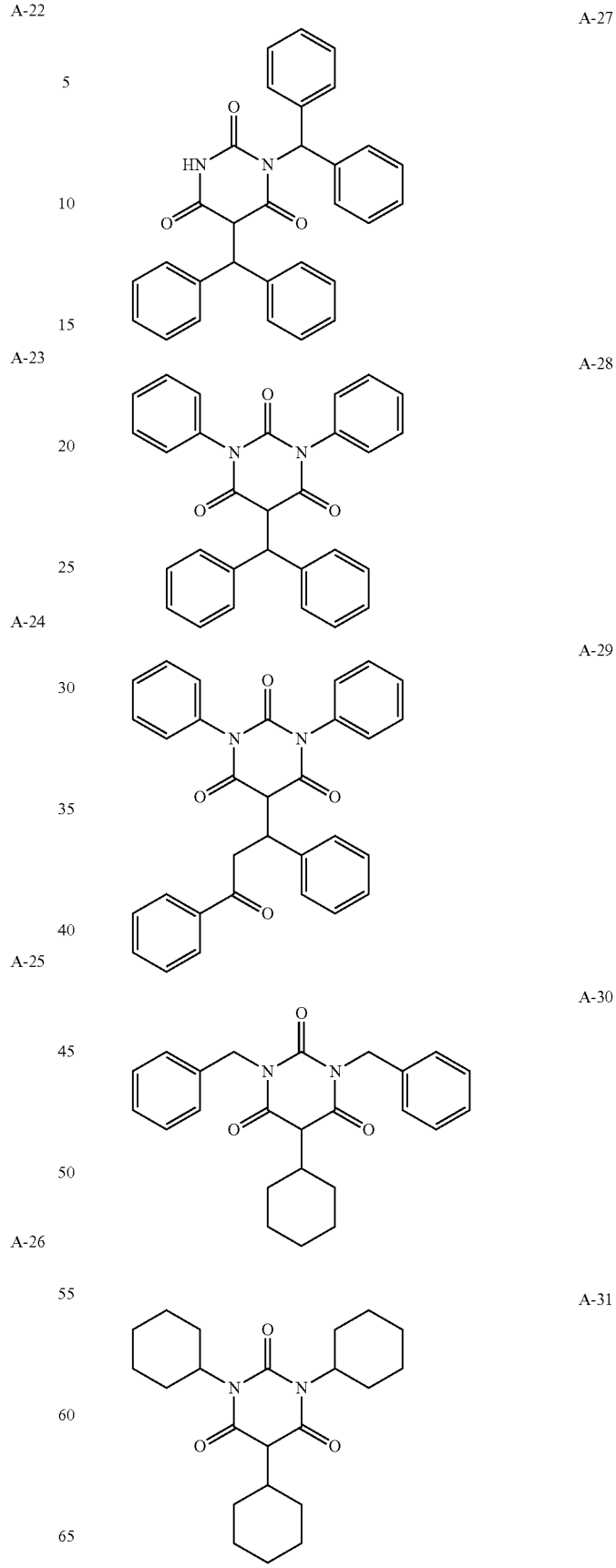

A-32 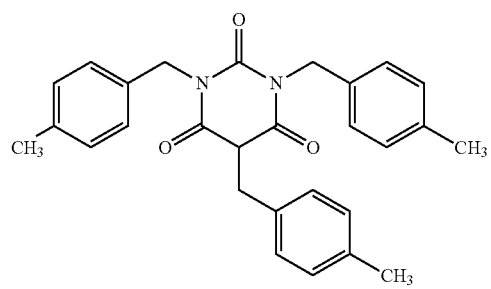
A-33 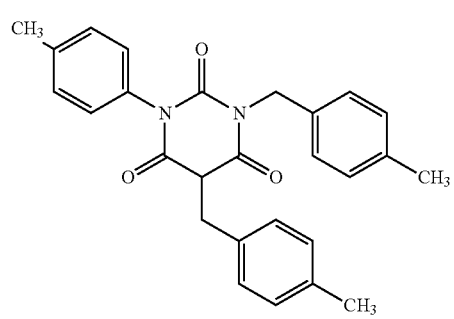
A-34 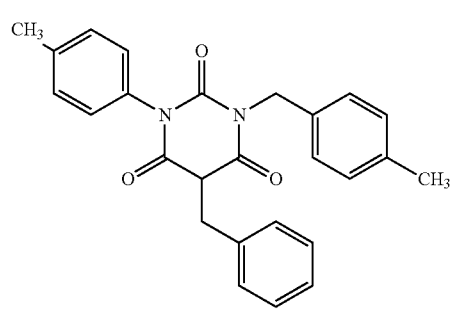
A-35 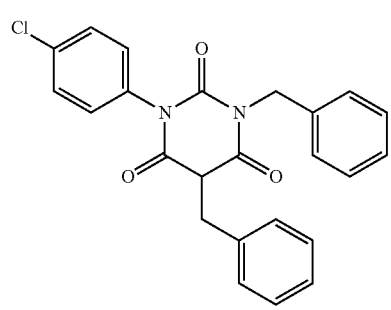
A-36 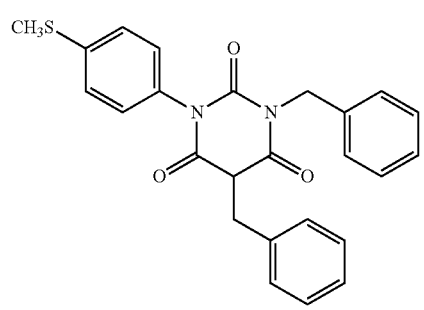
A-37 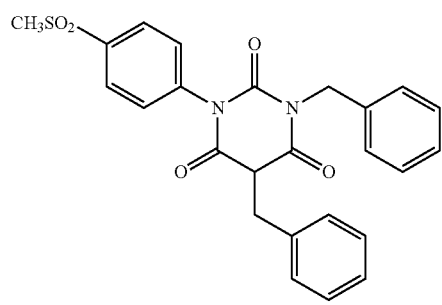
A-38 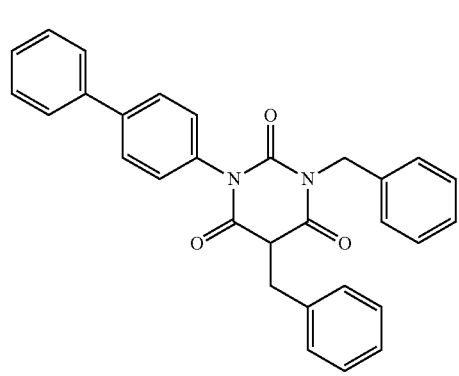
A-39 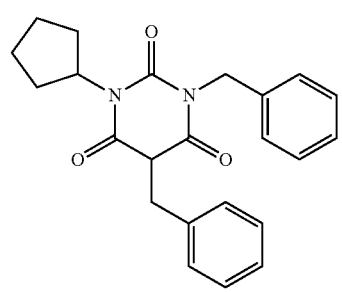
A-40 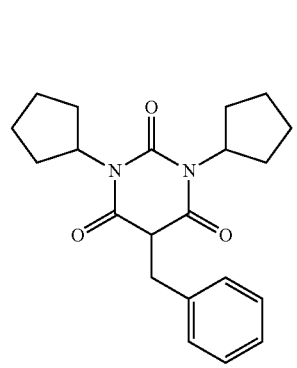
A-41 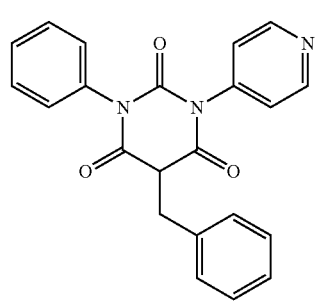

A-42 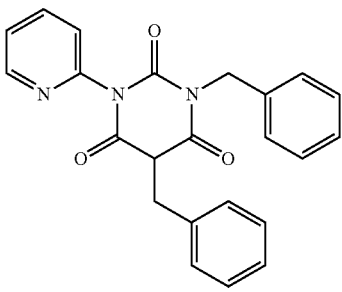

A-43 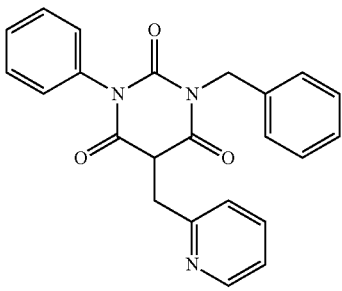

A-44 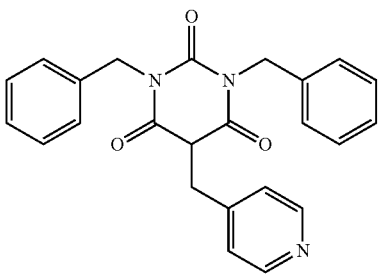

A-45 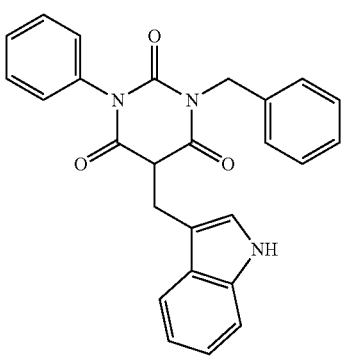

A-46 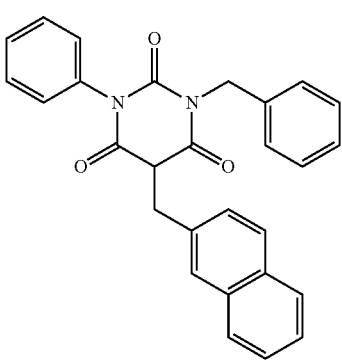

A-47 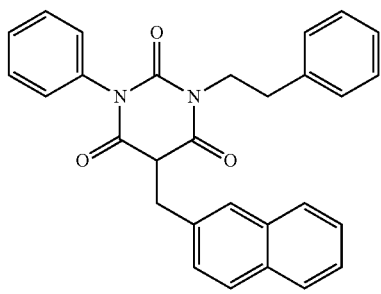

A-48 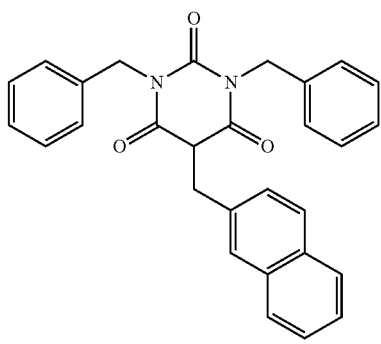

It is possible to add the compound represented by Formula 3 in a state of a hydrate, a solvate, or a salt. Furthermore, the hydrate may be an organic solvent, and the solvate may contain water.

It is possible to synthesize the compound represented by Formula 3 by using a synthesis method of a barbituric acid in which a urea derivative and a malonic acid derivative are condensed. A barbituric acid having two substituents on a nitrogen atom can be obtained by heating N,N'-disubstituted urea and malonic acid chloride, or by mixing and heating N,N'-disubstituted urea, a malonic acid, and an activating agent such as acetic anhydride. For example, methods described in Journal of the American Chemical Society, Vol. 61, P. 1015 (1939), Journal of Medicinal Chemistry, Vol. 54, P. 2409 (2011), Tetrahedron Letters, Vol. 40, P. 8029 (1999), the pamphlet of WO2007/150011A, and the like can be preferably used.

The content of the compound represented by Formula 3 in the cellulose acylate film is preferably 0.1 to 20 parts by mass, is more preferably 0.2 to 15 parts by mass, and is even more preferably 0.3 to 10 parts by mass, with respect to 100 parts by mass of the cellulose acylate.

In addition, a mass ratio of the organic acid described above to the compound represented by Formula 3 is preferably 95:5 to 10:90, and is more preferably 90:10 to 30:70. According to the range described above, it is possible to further improve the durability of the polarizer.

<<<Polycondensation Ester>>>

The film of the present invention may contain polycondensation ester. The polycondensation ester can be preferably obtained from a dicarboxylic acid (also referred to as an aromatic dicarboxylic acid) having at least one type of aromatic ring, and at least one type of diol.

(Aromatic Dicarboxylic Acid Residue)

An aromatic dicarboxylic acid residue is contained in polycondensation ester obtained from diol and a dicarboxylic acid containing an aromatic dicarboxylic acid.

Herein, the residue indicates a partial structure having the characteristics of a monomer forming the polycondensation ester in a partial structure of the polycondensation ester. For example, a dicarboxylic acid residue formed of a dicarboxylic acid HOOC—R—COOH (R represents a hydrocarbon group) is —OC—R—CO—.

A content ratio of the aromatic dicarboxylic acid residue in the polycondensation ester (the ratio of the aromatic dicarboxylic acid residue) is preferably greater than or equal to 40 mol %, is more preferably 40 mol % to 95 mol %, is even more preferably 45 mol % to 70 mol %, and is particularly preferably 50 mol % to 70 mol %.

Examples of the aromatic dicarboxylic acid can include a phthalic acid, a terephthalic acid, an i.sophthalic acid, a 1,5-naphthalene dicarboxylic acid, a 1,4-naphthalene dicarboxylic acid, a 1,8-naphthalene dicarboxylic acid, a 2,8-naphthalene dicarboxylic acid, a 2,6-naphthalene dicarboxylic acid, or the like. The phthalic acid, the terephthalic acid, and the isophthalic acid are preferable, the phthalic acid and the terephthalic acid are more preferable, and the terephthalic acid is even more preferable.

Specifically, the aromatic dicarboxylic acid residue preferably contains at least one type of a phthalic acid residue, a terephthalic acid residue, or an isophthalic acid residue, more preferably contains at least one type of a phthalic acid residue or a terephthalic acid residue, and even more preferably contains a terephthalic acid residue.

The content of the terephthalic acid residue in the dicarboxylic acid residue of the polycondensation ester is preferably 40 mol % to 95 mol %, is more preferably 45 mol % to 70 mol %, and is even more preferably 50 mol % to 70 mol %. By setting the ratio of the terephthalic acid residue to be greater than or equal to 40 mol %, it is possible to obtain a cellulose acylate film having sufficient optical anisotropy. In addition, by setting the ratio of the terephthalic acid residue to be less than or equal to 95 mol %, compatibility with respect to the cellulose acylate is excellent, and it is possible to suppress the bleed out even at the time of manufacturing the cellulose acylate film and performing heating and stretching.

(Aliphatic Dicarboxylic Acid Residue)

The polycondensation ester may contain an aliphatic dicarboxylic acid residue in addition to the aromatic dicarboxylic acid residue. The aliphatic dicarboxylic acid residue is contained in polycondensation ester obtained from diol, and a dicarboxy lie acid containing an. aliphatic dicarboxylic acid.

Examples of the aliphatic dicarboxylic acid include an oxalic acid, a malonic acid, a succinic acid, a maleic acid, a fumaric acid, a glutaric acid, an adipic acid, a pimelic acid, a suberic acid, an azelaic acid, a sebacic acid, a dodecane dicarboxylic acid, a 1,4-cyclohexane dicarboxylic acid, or the like.

One type of the aliphatic dicarboxylic acid may be used, or two or more types thereof may be used, and in a ease where two or more types of the aliphatic dicarboxylic acids are used, it is preferable that the succinic acid and the adipic acid are used. In a case where one type of the aliphatic dicarboxylic acid is used, it is preferable that the succinic acid is used. This is preferable from the viewpoint of the compatibility with respect to the cellulose acylate since the average number of carbon atoms of a diol residue can be adjusted to a desired value.

(Aliphatic Diol)

An aliphatic diol residue is contained in polycondensation ester obtained from aliphatic diol and a dicarboxylic acid.

Herein, the residue indicates a partial structure having the characteristics of a monomer forming the polycondensation ester in a partial structure of the polycondensation ester. For example, a diol residue formed of diol HO—R—OH is —O—R—O—.

Examples of the diol forming the polycondensation ester include aromatic diol and aliphatic diol, and it is preferable that the diol includes at least the aliphatic diol.

The polycondensation ester preferably contains an aliphatic diol residue of which the average number of carbon atoms is from 2.5 to 7.0, and more preferably contains an aliphatic diol residue of which the average number of carbon atoms is from 2.5 to 4.0.

Alkyl diol or alicyclic diols can be included as the aliphatic diol, examples of the aliphatic diol include ethylene glycol, 1,2-propane diol, 1,3-propane diol, 1,2-butane diol, 1,3-butane diol, 2-methyl-1,3-propane diol, 1,4-butane diol, 1,5-pentane diol, 2,2-dimethyl-1,3-propane diol (neopentyl glycol), 2,2-diethyl-1,3-propane diol (3,3-dimethylol pentane), 2-n-butyl-2-ethyl-1,3-propane diol (3,3-dimethylol heptane), 3-methyl-1,5-pentane diol, 1,6-hexane diol, 2,2,4-trimethyl-1,3-pentane diol, 2-ethyl-1,3-hexane diol, 2-methyl-1,8-octane diol, 1,9-nonane diol, 1,10-decane diol, 1,12-octadecane diol, diethylene glycol, cyclohexane dimethanol, and the like, and it is preferable that the aliphatic diol is used as one type or two or more types of mixtures along with ethylene glycol. At least one type of ethylene glycol, 1,2-propane diol, or 1,3-propane diol is preferable as the aliphatic diol, and at least one of ethylene glycol or 1,2-propane diol is preferable as the aliphatic diol. In the polycondensation ester, a diol residue is formed of the diol which is used as a raw material.

(Terminal Sealing)

A terminal of the polycondensation ester is not sealed but is a hydroxyl group or a carboxylic acid as it is, or the terminal of the polycondensation ester may be sealed by further performing a reaction with respect to monocarboxylic acids or monoalcohols.

An acetic acid, a propionic acid, a butanoic acid, a benzoic acid, and the like are preferable as the monocarboxylic acids used for sealing the terminal, the acetic acid or the propionic acid is more preferable, and the acetic acid is most preferable. Methanol, ethanol, propanol, isopropanol, butanol, isobutanol, and the like are preferable as the monoalcohols used for sealing the terminal, and the methanol is most preferable.

It is more preferable that the terminal of the polycondensation ester is not sealed but is a diol residue as it is, and it is even more preferable that the terminal of the polycondensation ester is sealed with an acetic acid or a propionic acid.

A number average molecular weight of the polycondensation ester is preferably 500 to 2,000, is more preferably 600 to 1,500, and is even more preferably 700 to 1,200.

The content of the polycondensation ester is preferably 1 to 30 parts by mass, is more preferably 3 to 25 parts by mass, and is even more preferably 5 to 20 parts by mass, with respect to 100 parts by mass of the cellulose acylate.

It is preferable that an acid value of the polycondensation ester is less than 1 mgKOH/g. The acid value of the polycondensation ester can be measured by the same method as that in a case of the acid value of the organic acid.

Sugar ester described in paragraphs 0012 to 0031 of JP2014-08169A, or the like can also be used instead of the polycondensation ester described above, and the polycondensation ester and the sugar ester may be used together as described in JP2014-08169A.

<<<Retardation Increasing Agent>>>

The film of the present invention can contain a compound having two or more aromatic rings as a retardation increasing agent. A molecular weight of the compound having two or more aromatic rings is preferably 300 to 1,200, and is more preferably 400 to 1,000.

Examples of the compound having two or more aromatic rings include a triazine compound described in JP2003-344655A, a rod-like compound described in JP2002-363343A, a liquid crystal compound described in JP2005-134884A and JP2007-119737A, and the like. The triazine compound or the rod-like compound described above is more preferable. Two or more types of the compounds having two or more aromatic rings can be used together.

It is preferable that a compound represented by General Formula (IIIA) or (IIIB) described below is contained as the retardation increasing agent.

General Formula (IIIA)

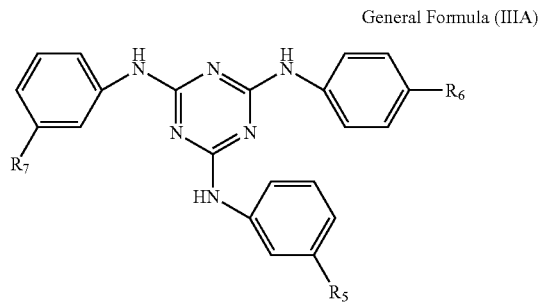

$R_5$ to $R_7$ each independently represent —$OCH_3$ or —$CH_3$.

General Formula (IIIB)

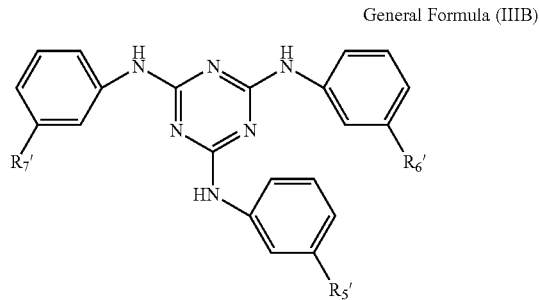

$R_5'$ to $R_7'$ each independently represent —$OCH_3$ or —$CH_3$.

The content of the retardation increasing agent is preferably 0.05 to 10 parts by mass, is more preferably 0.5 to 8 parts by mass, and is even more preferably 1 to 5 parts by mass, with respect to 100 parts by mass of the cellulose acylate.

<<<Fine Particles>>>

The film of the present invention may contain fine particles from the viewpoint of film slidability and stable manufacturing. The fine particles are also referred to as a matting agent, and may be an inorganic compound, or may be an organic compound. Preferred examples of the fine particles, for example, can be referred to fine particles described in the section of (Matting Agent Fine Particles) in paragraphs [0024] to [0027] of JP2012-177894A or in the section of (Matting Agent) in paragraphs [0122] and [0123] of JP2012-181516A.

The content of the fine particles in the cellulose acylate film, is preferably 0.01 to 5.0 mass %, is more preferably 0.03 to 3.0 mass %, and is particularly preferably 0.05 to 1.0 mass %.

<Manufacturing Method of Cellulose Acylate Film>

It is preferable that a manufacturing method of a cellulose acylate film of the present invention includes a step of applying the organic acid satisfying the requirements of a to c onto the cellulose acylate film. For example, the cellulose acylate film of the present invention can be manufactured by a step of casting a dope solution (a solution in which cellulose acylate is dissolved in an organic solvent), a step of drying a film which is Obtained by the casting, a step of stretching the film after being dried, a step of applying a solution containing the organic acid satisfying the requirements of a to c onto the film after being stretched, and a step of performing a surface treatment.

<<Dope Solution>>

A dope can be manufactured by dissolving the cellulose acylate in the organic solvent. It is preferable that the organic solvent includes a solvent selected from ether having 3 to 12 carbon atoms, ketone having 3 to 12 carbon atoms, ester having 3 to 12 carbon atoms, and halogenated hydrocarbon having 1 to 6 carbon atoms.

Examples of the ethers having 3 to 12 carbon atoms include diisopropyl ether, dimethoxy methane, dimethoxy ethane, 1,4-dioxane, 1,3-dioxolane, tetrahydrofuran, anisole, and phenetole. Examples of the ketones having 3 to 12 carbon atoms include acetone, methyl ethyl ketone (MEK), diethyl ketone, diisobutyl ketone, cyclohexanone, and methyl cyclohexanone. Examples of the esters having 3 to 12 carbon atoms include ethyl formate, propyl formate, pentyl formate, methyl acetate, ethyl acetate, and pentyl acetate. In addition, 2-ethoxy ethyl acetate, 2-methoxy ethanol, and 2-butoxy ethanol can be used as an organic solvent having two or more types of functional groups. It is preferable that the number of carbon atoms of the halogenated hydrocarbon is 1 or 2, and it is preferable that halogen of the halogenated hydrocarbon is chlorine. Methylene chloride is representative halogenated hydrocarbon.

Two or more types of the organic solvents may be used by being mixed.

A cellulose acylate solution can be manufactured by a method in which a treatment is performed at a temperature of higher than or equal to 0° C. (an ordinary temperature or a high temperature). The solution can be prepared by using a preparation method and a device of a dope in a general manufacturing method of a solution casting film.

It is preferable that the amount of the cellulose acylate in the solution to be obtained is adjusted to be 10 to 40 mass %. The solution can be prepared by stirring the cellulose acylate and the organic solvent at an ordinary temperature (0° C. to 40° C.). A solution having a high concentration may be stirred under conditions of pressurizing and heating. Specifically, it is preferable that the cellulose acylate and the organic solvent are put into a pressurized vessel and the pressurized vessel is sealed, and the cellulose acrylate and the organic solvent are stirred while being heated to a temperature higher than or equal to a boiling point and a temperature in a range where the solvent is not boiled in the ordinary temperature of the solvent under pressurization. A heating temperature is generally higher than or equal to 40° C., is preferably 60° C. to 200° C., and is more preferably 80° C. to 110° C. It is preferable that the concentration of the dope before being cast is adjusted such that the amount of solid contents becomes 18 to 35 mass %, A casting method and a drying method in the manufacturing method of a solution casting film are described in each specification of U.S. Pat. Nos. 2,336,310A, 2,367,603A, 2,492,078A, 2,492,977A, 2,492,978A, 2,607,704A, 2,739,069A, 2,739,070A, GB640731A, and GB736892A, and in each publication of JP1970-4554B (JP-S45-4554B), JP1974-5614B (JP-S49-5614B), JP1985-176834A (JP-S60-176834A), JP1985-203430A (JP-S60-203430A), and JP1987-115035A (JP-S62-115035A).

<<Step of Casting Dope Solution>>

The obtained dope may be cast onto a smooth band or a drum which is a metal support as a single layer liquid, or a plurality of cellulose acylate solutions of two or more layers may be cast.

In a case where the plurality of cellulose acylate solutions are cast, the film may be prepared while being laminated by casting the solution containing the cellulose acylate from each of a plurality of casting ports disposed on the metal support in a travelling direction at intervals, and for example, methods described in each publication of JP1986-158414A (JP-S61-158414A), JP1989-122419A (JP-H1-122419A), and JP1999-198285A (JP-H11-198285A) can be applied. In addition, the film may be formed by casting the cellulose acylate solution from two casting ports, and for example, the film formation can be performed by methods described in each publication of JP1985-27562B (JP-S60-27562B), JP1986-94724A (JP-S61-94724A), JP1986-947245A (JP-S61-947245A), JP1986-104813A (JP-S61-104813A), JP1986-158413A (JP-S61-158413A), and JP1994-134933A (JP-H06-134933A). In addition, a casting method of a cellulose acylate film may be used in which flow of a cellulose acylate solution having a high viscosity described in. JP1981-162617A (JP-S56-162617A) is enclosed with a cellulose acylate solution having a low viscosity, and the cellulose acylate solution having a high viscosity and the cellulose acylate solutions having a low viscosity are simultaneously extruded. Further, as described in each publication of JP1986-94724A (JP-S61-94724A) and JP1986-94725A (JP-S61-94725A), it is also preferable that a solution on a surface side contains an alcohol component which is a poor solvent more than a solution on an inner side.

In a case of performing co-casting, the thickness on the inner side and on the surface side is not particularly limited, but the thickness on the surface side is preferably 1% to 50% of the total film thickness, and is more preferably 2% to 30% of the total film thickness. Here, in a case of performing co-casting of three or more layers, the total film thickness of the outermost layer in contact with a metal support for casting and the outermost layer in contact with an air side is defined as the thickness on the surface side.

In a case of performing the co-casting, cellulose acylate solutions having different substitution degrees are co-cast, and thus, it is possible to prepare a cellulose ester film having a laminated structure.

<<Step of Drying Film>>

In general, drying is performed by a method in which hot air is applied from a surface of a web on a metal support (a drum or a belt) a surface side, that is, on the metal support, a method in which hot air is applied from a back surface of a drum or a belt, a back surface liquid heat-transmitting method in which a liquid of which the temperature is controlled is brought into contact with a belt or a drum from a back surface on a side opposite to a dope casting surface, the drum or the belt is heated by heat transmission, and a surface temperature is controlled, and the like. In particular, the back surface liquid heat-transmitting method is preferable.

A drying temperature is preferably 80° C. to 160° C., and is more preferably 100° C. to 140° C. A drying time is preferably 5 minutes to 1 hour, and is more preferably 10 minutes to 30 minutes.

<<Step of Stretching Film>>

It is preferable that the film after being dried is stretched at a temperature higher than or equal to "glass transition temperature (Tg) −10° C." from the viewpoint of retardation increasing properties. It is also preferable that a stretching direction of the film of the present invention is any one of a film handling direction and a direction orthogonal to the handling direction (a width direction).

A method of performing stretching in the width direction, for example, is described in each publication of JP1987-115035A (JP-S62-115035A), JP1992-152125A (JP-H04-152125A), JP1992-284211A (JP-H04-284211A), JP1992-298310A (JP-H04-298310A), JP1999-48271A (JP-H11-48271A), and the like. In a case of performing stretching in a longitudinal direction, for example, the film is stretched in a case where a speed of a handling roller of the film is adjusted, and a winding speed of the film is set to be faster than a peeling speed of the film. In a case of performing stretching in the width direction, the film can be stretched by handling the film while retaining the width of the film with a tenter, and by gradually widening the width of the tenter. The stretching can also be performed by using a stretching machine (preferably, uniaxial stretching using a long stretching machine) after the film is dried.

A stretching ratio of the film of the present invention is preferably from 5% to 200%, and is more preferably from 10% to 100%.

<<Step of Applying Organic Acid Solution>>

It is preferable that the organic acid solution contains the organic acid satisfying the requirements of a to c, the cellulose acylate, and the fine particles. The amount of organic acid in the organic acid solution is preferably 1 to 15 mass %, and is more preferably 1 to 10 mass %. The amount of cellulose acylate in the organic acid solution is preferably 1 to 15 mass %, and is more preferably 1 to 10 mass %. The amount of fine particles in the organic acid solution is preferably 0.1 to 2 mass %, and is more preferably 0.1 to 1 mass %.

A method of applying the organic acid solution is not particularly limited, and examples of the method of applying the organic acid solution include a spin coating method, an air knife coating method, a curtain coating method, a roller coating method, a wire bar coating method, a gravure coating method, a die coating method, and the like, and the wire bar coating method is preferable.

<<Step of Performing Surface Treatment>>

Examples of a method of performing a surface treatment include a corona discharge treatment, a glow discharge treatment, a flame treatment, an acid treatment, an alkali treatment, or an ultraviolet ray irradiation treatment. In addition, as described in JP1995-333433A (JP-H07-333433.A), it is also preferable that an undercoat layer is disposed. In a case of being used as a transparent protective film of a polarizing plate, it is particularly preferable that the acid treatment or the alkali treatment, that is, a saponification treatment with respect to cellulose acylate is performed, from the viewpoint of adhesiveness with respect to a polarizer formed of a material having a hydrophilic group such as polyvinyl alcohol.

It is preferable that an alkali saponification treatment is performed at a cycle in which a film surface is dipped in an alkali solution, and then, is neutralized with an acidic solution, is washed with water, and is dried. Examples of the alkali solution include a potassium hydroxide solution and a sodium hydroxide solution, and it is preferable that a hydroxide ion concentration is in a range of 0.1 to 3.0 mol/L. An alkali solution temperature is preferably in a range of room temperature to 90° C., and is more preferably in a range of 40° C. to 70° C.

<Laminate>

The cellulose acylate film of the present invention can be preferably used as a protective film of a polarizing plate. In this case, the film of the present invention may be used as a single layer film, or can be used as a laminate in which other layers are disposed, and in particular, can be preferably used as a phase difference film in which a liquid crystal layer is disposed. In addition, the cellulose acylate film of the present invention can be used as a laminate in which a hard coat layer is disposed.

In the cellulose acylate film of the present invention, the average concentration of the organic acid described above in the region from one surface to the depth of 0 to 0.2 μm is lower than the average concentration of the organic acid in the residual region other than the region described above. Here, it is preferable that the liquid crystal layer or the hard coat layer is disposed on the other surface on a side opposite to the one surface described above of the cellulose acylate film.

<<Liquid Crystal Layer>>

A rod-like liquid crystal compound is preferable as a liquid crystal compound forming the liquid crystal layer. A rod-like liquid crystal compound which can be used, for example, can be referred to the description in paragraphs 0045 to 0066 of JP2009-217256A, and the contents thereof are incorporated herein. In addition, an additive which can be used in the liquid crystal layer and a formation method of a liquid crystal layer, for example, can be referred to the description in [0076] to [0079] of JP2009-237421A, and the contents thereof are incorporated herein.

It is preferable that the liquid crystal compound forming the liquid crystal layer contains at least one type of a compound represented by General Formula (IIA) described below or a compound represented by General Formula (IIB) described below.

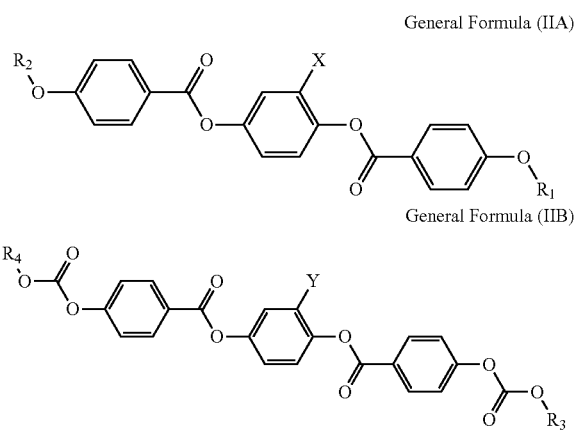

General Formula (IIA)

General Formula (IIB)

$R_1$ to $R_4$ are each independently —$(CH_2)_n$—OOC—CH=$CH_2$, and n represents an integer of 2 to 5. X and Y each independently represent a hydrogen atom or a methyl group.

In General Formula (IIA) or (IIB) described above, it is preferable that X and Y represent methyl groups from the viewpoint of restraining crystal precipitation.

The content of the liquid crystal compound forming the liquid crystal layer in the liquid crystal layer is preferably greater than or equal to 70 mass %, and is more preferably greater than or equal to 80 mass %.

The thickness of the liquid crystal layer is preferably 0.01 to 10 μm, and is more preferably 0.5 to 2 μm.

It is preferable that the liquid crystal layer is formed by applying a composition containing the liquid crystal compound described above, a vertical alignment agent, a polymerization initiator, a sensitizer, and the like onto the surface of the cellulose acylate film or an interlayer described below, and as necessary, by performing a heating treatment, and by immobilizing an alignment state of the liquid crystal compound.

A spin coating method, an air knife coating method, a curtain coating method, a roller coating method, a wire bar coating method, a gravure coating method, a die coating method, and the like are preferable as a coating method of the composition, and the wire bar coating method is more preferable.

In the conditions of the heating treatment, an optimal temperature is suitably selected according to the type of liquid crystal compound to be used, and in general, it is preferable that the heating treatment is performed at a temperature of 20° C. to 200° C. (preferably, 60° C. to 160° C.) for 10 to 600 seconds (preferably, 30 to 300 seconds).

An ultraviolet ray irradiation dose is preferably 100 to 400 mJ/cm$^2$, and is more preferably 100 to 350 mJ/cm$^2$.

It is preferable that a compound represented by General Formula (VI) described below is contained as the vertical alignment agent.

General Formula (VI)

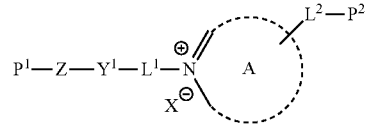

In General Formula (VI), a ring A represents quaternary ammonium ions formed of a nitrogen-containing heterocyclic ring, and X represents anions; $L^1$ represents a divalent linking group; $L^2$ represents a single bond or a divalent linking group; $Y^1$ represents a divalent linking group having a 5-membered ring or a 6-membered ring as a partial structure; Z represents a divalent linking group having an alkylene group having 2 to 20 carbon atoms as a partial structure; and $P^1$ and $P^2$ each independently represent a monovalent substituent having a hydrogen atom, a hydroxyl group, a carbonyl group, a carboxyl group, an amino group, a nitro group, an ammonium group, a cyano group, or a polymerizable ethylenically unsaturated group.

The compound represented by General Formula (VI), for example, can be referred to the description in paragraphs 0150 to 0183 of JP2013-235232A, and the contents thereof are incorporated herein.

It is preferable that the content of the vertical alignment agent is 0.01 to 1 mass % with respect to the total solid content of the composition for a liquid crystal layer.

Examples of the polymerization initiator include acetophenones, benzoins, benzophenones, phosphine oxides, ketals, anthraquinones, thioxanthones, azo compound, peroxides, 2,3-dialkyl dione compounds, disulfide compounds, fluoroamine compounds, aromatic sulfoniums, LOPHINE dimers, onium salts, borate salts, active esters, active halogens, inorganic complex, coumalins, and the like.

The content of the polymerization initiator is preferably 1 to 10 mass %, and is more preferably 1 to 5 mass %, with respect to the total solid content of the composition for a liquid crystal layer, <<Interlayer>>

In a case where a laminate of the present invention includes the liquid crystal layer, it is preferable that an interlayer is disposed between the cellulose acylate film and the liquid crystal layer.

An acrylic resin having a polar group can be used as the material of the interlayer. In a case where the interlayer is formed by using the acrylic resin having a polar group, sufficient adhesiveness is obtained even in a case where the cellulose acylate film is not subjected to a saponification treatment, and thus, it is possible to simplify a manufacturing process, and it is preferable from the viewpoint of productivity. The polar group indicates that a difference in electronegativity between two atoms bonded to each other is large, and specifically, examples of the polar group include at least one polar group selected from the group consisting of a hydroxyl group, a carbonyl group, a carboxyl group, an amino group, a nitro group, an ammonium group, and a cyano group, and the hydroxyl group is particularly preferable. The acrylic resin having a polar group may have a repeating unit which does not have a polar group, or may have a repeating unit other than a repeating unit derived from a compound containing a (meth)acryloyl group.

The interlayer can be formed by applying the composition for forming an interlayer onto the cellulose acylate film directly or through other layers, and by drying the composition for forming an interlayer.

It is preferable that the composition for forming an interlayer contains the acrylic resin described above, a polymerization initiator, a solvent, and the like.

The polymerization initiator described in the composition for a liquid crystal layer can be used as the polymerization initiator. The content of the polymerization initiator is preferably 0.1 to 20 parts by mass, is more preferably 1 to 15 parts by mass, and is even more preferably 1 to 10 parts by mass, with respect to 100 parts by mass of the acrylic resin described above.

It is preferable that a solvent having dissolving ability with respect to cellulose acylate and a solvent having swelling ability with respect to cellulose acylate can be used as the solvent.

In the total amount of solvents in the composition for forming an interlayer, the concentration of the solid contents in the composition is preferably in a range of 1 to 70 mass %, is more preferably in a range of 2 to 50 mass %, and is even more preferably in a range of 3 to 40 mass %.

The interlayer, for example, can be referred to the description in paragraphs 0121 to 0140 of JP2013-235232A, and the contents thereof are incorporated herein.

<<Hard Coat Layer>>

The hard coat layer is a layer formed by curing a curable resin composition containing a curable compound, a polymerization initiator, a solvent, and the like.

The curable compound is a compound which is cured by light or heat, and specifically; examples of the curable compound can include a material having a curable functional group which has a vinyl group, an allyl group, a (meth)acryloyl group, a glycidyl group, an epoxy group, and the like.

The curable compound may be a low molecular compound, may be an oligomer, or may be a polymer (a resin). More specifically, examples of the curable compound include an oligomer, a prepolymer, or the like of a polyfunctional compound such as ester of polyhydric alcohol and a (meth)acrylic acid, vinyl benzene and a derivative thereof, vinyl sulfone, (meth)acrylamide, a polyester resin, a polyether resin, an acrylic resin, an epoxy resin, a urethane resin, an alkyd resin, a spiroacetal resin, a polybutadiene resin, a polythiol polyene resin, and a polyhydric alcohol.

For example, the polymerization initiator and the solvent which are used in the interlayer described above can be used as the polymerization initiator and the solvent.

The content of the polymerization initiator in the composition for forming a hard coat layer is preferably 0.01 to 10 parts by mass, and is more preferably 0.1 to 5 parts by mass, with respect to 100 parts by mass of the curable compound.

In the total amount of solvents in the composition for forming a hard coat layer, the concentration of the solid contents in the composition is preferably in a range of 1 to 70 mass %, and is more preferably in a range of 2 to 50 mass %.

The thickness of the hard coat layer is preferably 0.5 to 50 μm, and is more preferably 1 to 20 μm.

<Polarizing Plate>

A polarizing plate of the present invention includes a polarizer, and at least one film or laminate of the present invention. The polarizing plate of the present invention is preferably a polarizing plate including a polarizer, and two protective films protecting of both surfaces of the polarizer described above, and at least one of the protective films described above is the film of the present invention.

Examples of the polarizer include an iodine-based polarizing film, a dye-based polarizing film using an dichroic dye, or a polyene-based polarizing film. In general, the iodine-based polarizing film and the dye-based polarizing film can be manufactured by using a polyvinyl alcohol-based film.

It is preferable that a film thickness in the entire polarizing plate is 80 to 120 μm.

<Liquid Crystal Display Device>

The present invention also relates to a liquid crystal display device including the film, the laminate, or the polarizing plate of the present invention. The film of the present invention may be incorporated in the liquid crystal display device as one member of the polarizing plate which is bonded to the polarizer. An example of the liquid crystal display device of the present invention is a liquid crystal display device including a liquid crystal cell, and a pair of polarizing plates disposed on both sides of the liquid crystal cell, in which at least one of the polarizing plates is the polarizing plate of the present invention.

The mode of the liquid crystal display device is not particularly limited, and may be any one of various display modes such as a twisted nematic (TN) mode, an in-plane switching (IPS) mode, a ferroelectric liquid crystal (FLC) mode, an anti-ferroelectric liquid crystal (AFLC) mode, an optically compensatory bend (OCB) mode, a supper twisted nematic (STN) mode, a vertically aligned (VA) mode, and a hybrid aligned nematic (HAN) mode. A liquid crystal display device in an IPS mode is preferable.

EXAMPLES

Hereinafter, the present invention will be described in more detail with reference to examples. Materials, use amounts, ratios, treatment contents, treatment sequences, and the like of the following examples can be suitably changed unless the changes cause deviance from the gist of the present invention. Accordingly, the range of the present invention will not be restrictively interpreted by the following specific examples.

Example 1

1. Preparation of Support
(1) Preparation of Cellulose Acylate Film
Each cellulose acylate film was prepared by the following method.
(1-1) Preparation of Dope
Preparation of Cellulose Acylate Solution:

A cellulose acylate solution (Concentration of Solid Contents: 22 mass %) formed of cellulose triacetate (Acetyl Substitution Degree: 2.87), polycondensation polyester shown in the following table (19 parts by mass with respect to 100 parts by mass of the cellulose triacetate), a compound L2 described below (5 parts by mass with respect to 100 parts by mass of the cellulose triacetate), and a solvent (a mixture of methylene chloride and ethanol, a mass ratio of 87:13) was put into a mixing tank, and was stirred, and thus, each component was dissolved. The obtained solution was further heated at 90° C. for approximately 10 minutes, and then, was filtered through a paper filter having an average hole diameter of 34 μm and a sintered metal filter having an average hole diameter of 10 μm.

The cellulose acylate solution in the amount of 100 parts by mass and the fine particle dispersion liquid described above in the amount where the amount of inorganic fine particles with respect to the cellulose acylate became 0.02 parts by mass were mixed, and thus, a dope was prepared.

(1-2) Casting

The dope described above was cast by using a band casting machine. Furthermore, a band was formed of stainless steel.

(1-3) Drying

A web (a film) formed by being cast was peeled off from the band, and then, was handled through pass rolls, and thus, was dried at a drying temperature of 120° C. for 20 minutes. Here, the drying temperature is a film surface temperature of the film.

(1-4) Stretching

The obtained web (film) was peeled off from the hand, was sandwiched between clips, and was stretched in a direction (TD) orthogonal to a film handling direction (MD) at a stretching temperature of 189° C. and a stretching ratio of 70% by using a tenter in fixed end uniaxial stretching conditions.

(1-5) Preparation of Organic Acid Solution

Each component described below was added to a solvent (Methyl Acetate:Methyl Ethyl Ketone:Propylene Glycol

TABLE 5

| Glycol Unit | | | | Dicarboxylic Acid Unit | | | Number |
|---|---|---|---|---|---|---|---|
| Sealing Rate of Both Terminals (Mol %) | Ethlyene Glycol (Mol %) | 1,2-Propane Diol (Mol %) | Average Number of Carbon Atoms | Terephthalic Acid (Mol %) | Succinic Acid (Mol %) | Average Number of Carbon Atoms | Average Molecular Weight |
| 100 Mol % Acetyl Group | 50 | 50 | 2.5 | 55 | 45 | 6.2 | 1,000 |

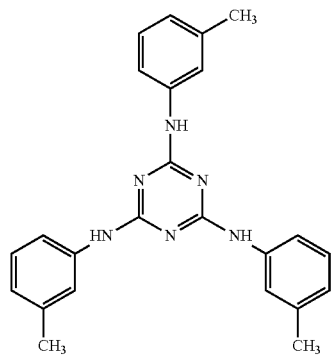

L2

Preparation of Fine Particle Dispersion Liquid:

Components described below containing the cellulose acylate solution prepared as described above were put into a disperser, and thus, a fine particle dispersion liquid was prepared.

| Fine Particle Dispersion Liquid | |
|---|---|
| Inorganic Fine Particles (AEROSIL (Registered Trademark) R972 manufactured by NIPPON AEROSIL) | 0.2 parts by mass |
| Methylene Chloride | 72.4 parts by mass |
| Methanol | 10.8 parts by mass |
| Cellulose Acylate Solution | 10.3 parts by mass |

1-Monomethyl Ether 2-Acetate, a mass ratio of 54:45:1) such that the total concentration of each of the components became 6.3 mass %. In order to dissolve cellulose acetate in the solution, the solution was cooled to -70° C., and thus, an organic acid solution was prepared.

| Composition of Organic Acid Solution | |
|---|---|
| Cellulose Acetate (Acetyl Group Substitution Degree: 2.81) | 100 parts by mass |
| Organic Acid | 150 parts by mass |
| Silica Particles (an average primary particle diameter of 1.2 nm, MEK-ST, manufactured by Nissan Chemical Industries, Ltd.) | 28.5 parts by mass |

The organic acid solution described above was applied onto one surface of the film after being subjected to the stretching described above by using a wire bar coater of #8, and was dried at 60° C. for 120 seconds.

Organic Acid K: POEM K-37V (manufactured by RIKEN VITAMIN CO., LTD.), and the structure thereof will be described below. The organic acid is a compound satisfying the requirements of a to c described herein.

Organic Acid K:

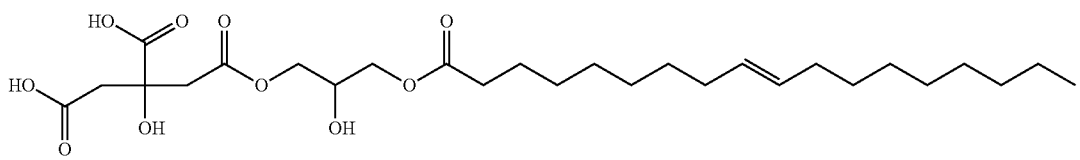 [SMILES: CCCCCCCC/C=C/CCCCCCCC(=O)OCC(O)COC(=O)CC(O)(CC(=O)O)C(=O)O]

(1-6) Saponification Treatment

The film coated with the organic acid solution was dipped in an aqueous solution of sodium hydroxide of 2.3 mol/L at 55° C. for 3 minutes. The film was washed in a water washing bath at a room temperature, and was neutralized at 30° C. by using a sulfuric acid of 0.05 mol/L. The film was washed again in the water washing bath at a room temperature, and was further dried with warm air at 100° C. Thus, the surface of the film was subjected to a saponification treatment. A film thickness of the obtained cellulose acylate film was 41 μm.

Example 2

In the preparation of the cellulose acylate solution, a film containing cellulose triacetate having an acetyl group substitution degree of 2.81 as an inner layer (a core layer) and cellulose triacetate having an acetyl group substitution degree of 2.87 as outer layers (skin layers) on both surfaces of the inner layer was prepared by performing co-casting of three layers, and was dried and stretched by the same method as that in Example 1. The organic acid solution described above was applied onto one surface of the film after being stretched by using a wire bar coater of #8, and was dried at 60° C. for 120 seconds. After the organic acid solution is dried, the surface of the film was subjected to a saponification treatment by the same method as that in Example 1. A film thickness of the inner layer was 36 μm, and a film thickness of the outer layer was 1.5 μm. A film thickness of the obtained cellulose acylate film was 39 μm.

Examples 3 to 5

A cellulose acylate film was obtained by the same method as that in Example 2 except that the acetyl group substitution degree of the cellulose triacetate used in the inner layer and the outer layer of the film was changed as shown in the following table in the preparation of the cellulose acylate solution, and a compound described below (a compound represented by Formula 3) was added in addition to the organic acid in the preparation of the organic acid solution. Furthermore, the total amount of the organic acid and the compound represented by Formula 3 was set to be identical to the added amount of the organic acid in Example 2. A mass ratio of the organic acid to the compound represented by Formula 3 is shown in the following table. A film thickness of the obtained cellulose acylate film is shown in the following table.

Example 6

A cellulose acylate film was obtained by the same method as that in Example 3 except that a mass ratio of the organic acid to the compound described below (the compound represented by Formula 3) was changed as shown in the following table, and the concentration of the organic acid solution was changed from 6.3% to 4.9% in the preparation of the organic acid solution. Furthermore, the total amount of the organic acid and the compound. represented by Formula 3 was set to the added amount of the organic acid shown in the following table.

Example 7

A cellulose acylate film was obtained by the same method as that in Example 6 except that the concentration of the organic acid solution was changed from 6.3% to 7.8%.

Compound Represented by Formula 3 Used in Example:

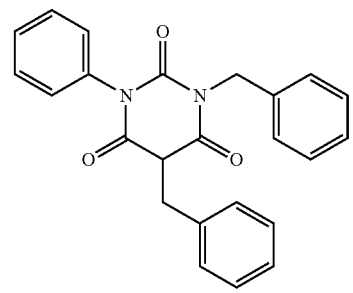 [SMILES: O=C1C(Cc2ccccc2)C(=O)N(c2ccccc2)C(=O)N1Cc1ccccc1]

Example 10

A cellulose acylate film was obtained by the same method as that in Example 3 except that the film thickness of the cellulose acylate film was changed to 11 μm.

Example 11

A cellulose acylate film was obtained by the same method as that in Example 1 except that a condensate B-2 in Table 2 described above was used instead of the organic acid K in Example 1.

Example 12

A cellulose acylate film was obtained by the same method as that in Example 1 except that a condensate C-2 in Table 3 described above was used instead of the organic acid K in Example 1.

Example 14

A cellulose acylate film was obtained by the same method as that in Example 3 except that the compound A-5 was used as the compound of Formula 3 in Example 3.

Comparative Example 1

Compositions described below were put into a mixing tank, and were stirred, each component was dissolved, and thus, a cellulose acylate solution 1 was prepared.

| Composition of Cellulose Acylate Solution 1 | |
|---|---|
| Cellulose Acetate Having Acetyl Substitution Degree of 2.45 and Polymerization Degree of 370 | 100.0 parts by mass |
| Polycondensation Polyester A Having Weight-Average Molecular Weight of 1,200 | 17.0 parts by mass |
| Methylene Chloride | 402.0 parts by mass |
| Methanol | 60.0 parts by mass |

Polycondensation Polyester A

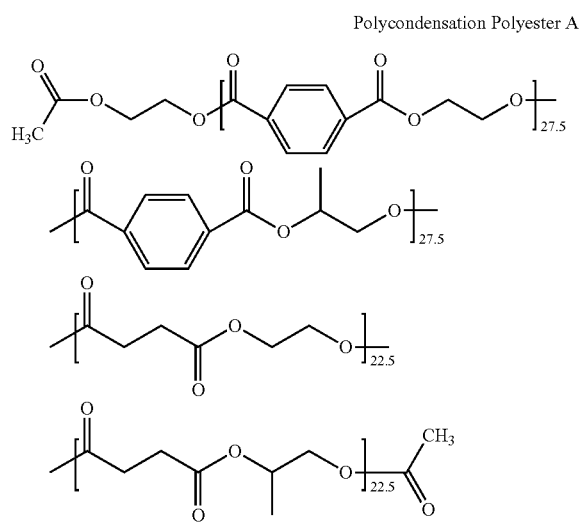

(Preparation of Matting Agent Solution 2)

Compositions described below were put into a disperser, and were stirred, each component was dissolved, and thus, a matting agent solution 2 was prepared.

| Composition of Matting Agent Solution 2 | |
|---|---|
| Silica Particles Having Average Particle Size of 20 nm (AEROSIL R972, manufactured by NIPPON AEROSIL) | 2.0 parts by mass |
| Methylene Chloride | 75.0 parts by mass |
| Methanol | 12.7 parts by mass |
| Cellulose Acylate Solution 1 Described above | 10.3 parts by mass |

(Preparation of Organic Acid Solution 3)

Compositions described below were put into a mixing tank, were stirred while being heated, each component was dissolved, and thus, an organic acid solution 3 was prepared.

| Composition of Organic Acid Solution 3 | |
|---|---|
| Organic Acid K | 20.0 parts by mass |
| Methylene Chloride (First Solvent) | 67.2 parts by mass |
| Methanol (Second Solvent) | 10.0 parts by mass |
| Cellulose Acylate Solution 1 Described above | 12.8 parts by mass |

The matting agent solution 2 described above (1.3 parts by mass) and the organic acid solution 3 (0.9 parts by mass) were respectively filtered, and then, were mixed by using an in-line mixer, and the cellulose acylate solution 1 (97.8 parts by mass) was added thereto, and was mixed by using the in-line mixer. The mixed solution was cast by using a band casting machine, was dried at 100° C. until a residual solvent content became 40 mass %, and then, the film was peeled off. The peeled-off film was further stretched at an atmospheric temperature of 150'C and a widening rate of 30% in a handling direction and a vertical direction by using a tenter stretching; device. The film after being further stretched at 140° C. was dried for 20 minutes. A film thickness of the obtained cellulose acylate film was 40 μm.

Comparative Example 2

A cellulose acylate film of Comparative Example 2 was obtained by the same method as that in Comparative Example 1 except that the amount of organic acid solution 3 was changed from 0.9 parts by mass to 4.5 parts by mass and the amount of cellulose acylate solution 1 was changed from 97.8 parts by mass to 94.2 parts by mass in Comparative Example 1. A film thickness of the obtained cellulose acylate film was 40 μm.

Comparative Example 3

(Preparation of Cellulose Acylate Solution C01 for Layer Having Low Substitution Degree)

Compositions described below were put into a mixing tank, and were stirred, each component was dissolved, and thus, a cellulose acylate solution was prepared.

| | |
|---|---|
| Cellulose Acetate (Acetyl Group Substitution Degree of 2.45) | 100.0 parts by mass |
| Polycondensation Polyester D | 19.0 parts by mass |
| Methylene Chloride | 365.5 parts by mass |
| Methanol | 54.6 parts by mass |

The polycondensation polyester D is a terephthalic acid/succinic acid/propylene glycol/ethylene glycol copolymer (Copolymerization Ratio [Mol %]=27.5/22.5/25/25).

(Preparation of Cellulose Acylate Solution S01 for Layer Having High Substitution Degree)

Compositions described below were put into a mixing tank, and were stirred, each component was dissolved, and thus, a cellulose acylate solution was prepared.

| | |
|---|---|
| Cellulose Acetate (Substitution Degree of 2.79) | 100.0 parts by mass |
| Organic Acid K | 7.5 parts by mass |
| Polycondensation Polyester D | 19.0 pasts by mass |
| Silica Fine Particles R972 (manufactured by NIPPON AEROSIL) | 0.15 parts by mass |
| Methylene Chloride | 395.0 parts by mass |
| Methanol | 59.0 parts by mass |

(Preparation of Cellulose Acylate Film)

The cellulose acylate solution C01 was cast such that a film thickness became 52 μm, and the cellulose acylate solution S01 was cast such that an outer layer A having a film thickness of 2 μm (the outermost layer on an air interface side) and an outer layer B having a film thickness of 2 μm (the outermost layer on a side opposite to the outer layer A) were respectively formed. The obtained film was peeled off from a hand, was sandwiched between clips, and was subjected to horizontal stretching at 140° C. and a stretching ratio of 1.08 times by using a tenter when the amount of residual solvent with respect to the mass of the entire film was in a state of 20 to 5 mass %. After that, the clip was detached from the film, and the film was dried at 130° C. for 20 minutes, and then, was subjected to the horizontal stretching again at 180° C. and a stretching ratio of 1.2 by using the tenter, and thus, a cellulose acylate film was prepared. A film thickness of the obtained cellulose acylate film was 40 μm.

Furthermore, the amount of residual solvent was obtained by the following expression.

Amount of Residual Solvent (Mass %)={(M−N)/N}×100

M is a mass of a web at an arbitrary time point, N is a mass when the web of which M has been measured is dried at 120° C. for 2 hours.

Comparative Example 4

A cellulose acylate film of Comparative Example 4 was obtained by the same method as that in Comparative Example 3 except that the amount of organic acid was changed from 7.0 parts by mass to 39 parts by mass in the preparation of the cellulose acylate solution S01 of Comparative Example 3. A film thickness of the obtained cellulose acylate film was 39 μm.

Comparative Example 5

A cellulose acylate film of Comparative Example 5 was obtained by the same method as that in Example 2 except that the cellulose acetate was removed from the organic acid solution used in Example 2, and each component of an organic acid solution was added to a solvent (Methyl Acetate:Methyl Ethyl Ketone:Propylene Glycol 1-Monomethyl Ether 2-Acetate, a mass ratio of 54:45:1) such that the total concentration of each of the components of the organic acid solution became 5.9 mass %, and thus, the organic acid solution was prepared at an ordinary temperature. A film thickness of the obtained cellulose acylate film was 39 μm.

Example 8

Formation of Interlayer

A mixture of acrylic compounds described below (100 parts by mass), a photopolymerization initiator (IRGACURE (Registered Trademark) 127, manufactured by BASF SE) (4 parts by mass and cyclohexanone were mixed, and a composition for forming an acrylic layer was prepared such that a concentration of solid contents became 15 mass %. The prepared composition for forming an acrylic layer was applied onto the surface of the cellulose acylate film obtained in Example 3 on a side opposite to the surface onto which the organic acid solution was applied by using a wire bar coater of #1.6, was dried at 60° C. for 0.5 minutes, and then, was irradiated with an ultraviolet ray at 30° C. for 30 seconds by using a high pressure mercury lamp of 120 W/cm, and thus, an interlayer was crosslinked. A film thickness of the interlayer was 0.6 μm.

A mixture having a mass ratio of ACR1/ACR2=67/33 was used as the mixture of the acrylic compounds.

ACR1: BLEMMER® GLM, manufactured by NOF CORPORATION, Compound Having Structure Described below

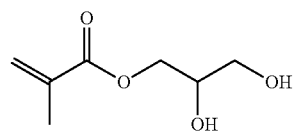

ACR2: KAYARAD® PET30, manufactured by Nippon Kayaku Co., Ltd., Mixture of Compounds Having Structure Described below (Pentaerythritol Triacrylate/Pentaerythritol Tetraacrylate).

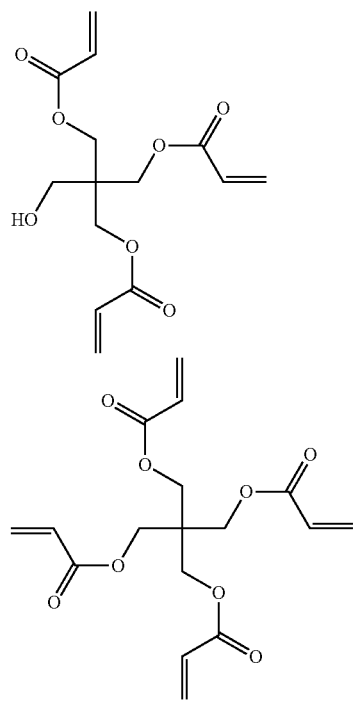

Formation of Liquid Crystal Layer

A solution in which a mixture of the liquid crystal compound B01 and the liquid crystal compound B02 (a mass ratio of 80:20) (1.8 g), a photopolymerization initiator (IRGACURE® 907, manufactured by BASF SE) (0.06 g), a sensitizer (KAYACURE ® DETX, manufactured by Nippon Kayaku Co., Ltd.) (0.02 g), and a vertical alignment agent S01 (0.002 g) were dissolved in 9.2 g of methyl ethyl ketone (MEK)/cyclohexanone (86/14 (Mass Ratio)) was applied onto the interlayer described above by using a wire bar of #3.2. This was bonded to a metal frame, was heated in a constant-temperature tank at 100° C. for 2 minutes, and the liquid crystal compound was aligned (homeotropic alignment). Next, the solution was cooled at 50° C., and then, was irradiated with an ultraviolet ray at irradiance 190 mW/cm² and irradiation dose of 300 mJ/cm² and at an oxygen concentration of approximately 0.1% under nitrogen purge by using an air-cooled metal halide lamp (manufactured by EYE GRAPHICS CO., LTD.) of 160 W/cm, and thus, a coated layer was cured. After that, the coated layer was left to cool to a room temperature. A thickness of a liquid crystal layer was 1.3 μm. Re of the liquid crystal layer at a wavelength of 550 nm was 0 nm, and Rth of the liquid crystal layer at a wavelength of 550 nm was −165 nm.

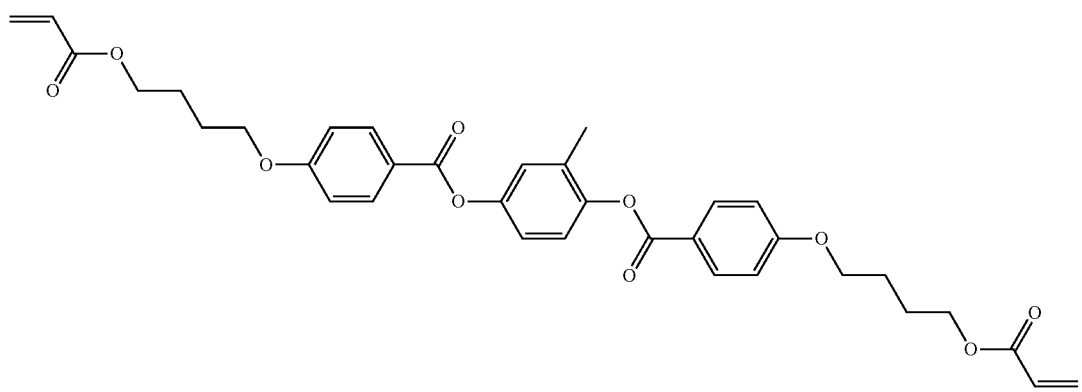

B01

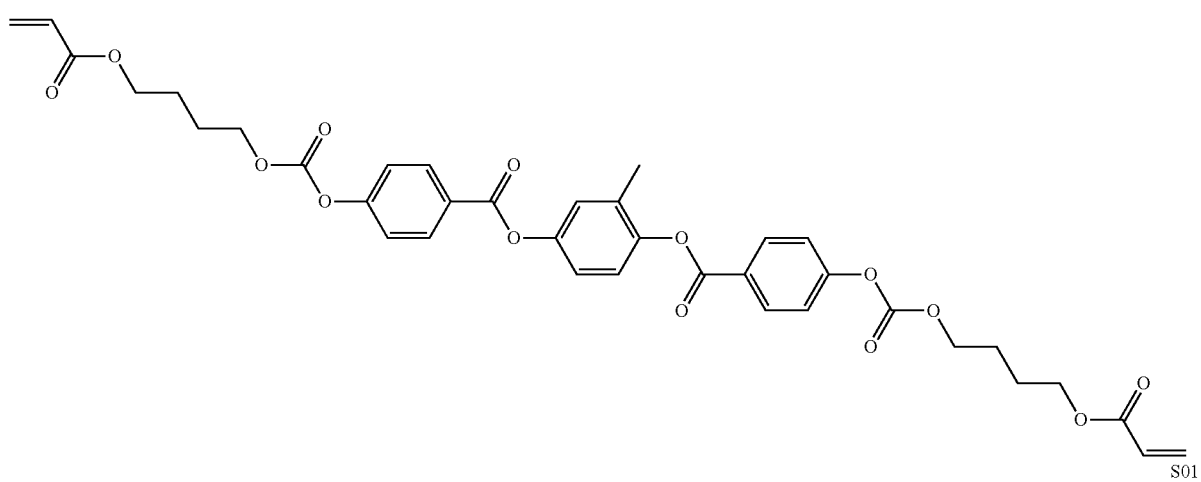

B02

S01

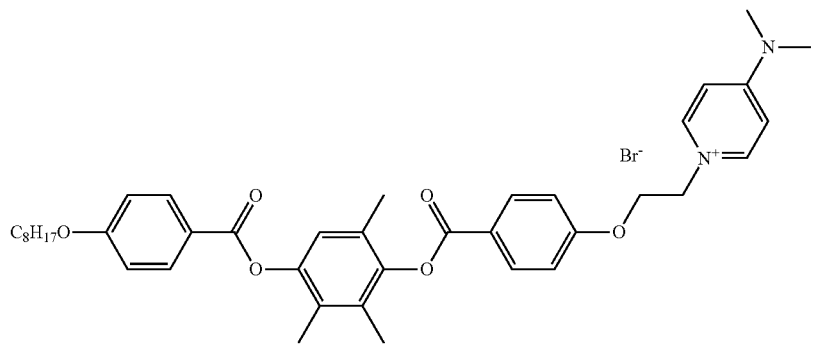

Example 13

A cellulose acylate film was obtained by the same method as that in Example 8 except that a condensate D-2 in Table 4 described above was used instead of the organic acid K in Example 8.

Example 15

A cellulose acylate film was obtained by the same method as that in Example 8 except that the compound A-21 described above was used as the compound of Formula 3 in Example 8.

Example 16

A cellulose acylate film was obtained by the same method as that in Example 8 except that the condensate D-2 Table 4 described above was used instead of the organic acid K in Example 8, and the compound A-21 described above was used as the compound of Formula 3.

Example 9

Preparation of Hard Coat Layer Coating Liquid;

A hard coat layer coating liquid was set such that a concentration of solid contents became 55 mass %, and a mass ratio of a monomer to a photopolymerization initiator became 53.5/1.5. PET30 (manufactured by Nippon Kayaku Co., Ltd.) was used as the monomer, and ethyl acetate was used as a solvent. IRGACURE® 127 (manufactured by BASF SE) was used as the photopolymerization initiator.

Formation of Hard Coat Layer;

In the cellulose acylate film obtained in Example 3, the hard coat layer coating liquid was applied onto the surface on a side opposite to the surface onto which the organic acid solution was applied, and thus, a hard coat layer was formed. In coating conditions of the hard coat layer, the coating liquid was manually applied by using a bar coater of 48, and then, was dried at 100° C. for 60 seconds, was irradiated with an ultraviolet ray at 300 mJ in conditions of nitrogen of less than or equal to 0.1% by using a metal halide lamp of 1.5 kW, and was cured. A hard coat hardness after being cured was higher than or equal to 3 H. The thickness of the hard coat layer was 5.8 μm.

<Measurement Method of Amount of Organic Acid>

The film prepared in each of the examples and the comparative examples were cut at a tilt with respect to a film surface by an angle of 1', and a film cross section was subjected to mapping measurement by using a time-of-flight secondary ion mass spectrometer (TOF-SIMS). In negative measurement, an abundance ratio of the organic acids existing in a depth of less than or equal to 0.2 μm from the surface (the surface onto which the organic acid solution was applied) was obtained from a ratio of a peak surface area value of molecule-H+ ion in a portion corresponding to a depth of less than or equal to 0.2 μm from the surface and a peak surface area value of the entire film. An abundance ratio of the organic acids in a depth of greater than or equal to 0.2 μm (to an opposite surface) was also obtained by the same method.

<Calculate Method of Average Concentration of Organic Acid>

The average concentration of the organic acid in the depth of less than or equal to 0.2 μm from the surface (the surface onto which the organic acid solution was applied) was obtained from the abundance ratio of the organic acids and the amount of organic acid which was actually added. The average concentration of the organic acid in the depth of greater than or equal to 0.2 μm (to the opposite surface) was also obtained by the same method. The results are shown in the following table.

<Evaluation of Bleed Out of Additive>

The cellulose acylate film or the laminate was put into an atmosphere of a temperature of 85° C. and relative humidity of 85%, the surface (the surface onto which the organic acid was applied) of the film or the laminate after 17 hours had elapsed was observed by using an optical microscope and by using differential interference, and thus, the presence or absence of bleed out was determined. The results are shown in the following table.

<Preparation of Polarizing Plate>

The cellulose acylate film or the laminate prepared in each of the examples and the comparative examples were bonded to a polyvinyl alcohol-based polarizer by using an adhesive. At this time, the surface of the cellulose acylate film onto which the organic acid solution was applied was bonded to the polarizer. FUJITAC (Registered Trademark) TD80 (manufactured by Fujifilm Corporation) was bonded onto the opposite side surface of the polarizer (the surface onto which the cellulose acylate film was not bonded), and thus, a polarizing plate was prepared.

<Evaluation of Polarizer Durability>

In the polarizing plate prepared as described above, an orthogonal transmittance of the polarizer at a wavelength of 410 nm and 700 nm was measured. After that, the polarizing plate was retained for 17 hours under an environment of a temperature of 85° C. and relative humidity of 85%, and then, the orthogonal transmittance was measured by the same method. The orthogonal transmittance of the polarizing plate was measured by using a automatic polarizing film measurement device VAP-7070 (manufactured by JASCO Corporation).

A change in orthogonal transmittances before and after being aged/a orthogonal transmittance before being aged was obtained from the above description. The results are shown in the following table. Furthermore, relative humidity under an environment where the humidity was not adjusted was in a range of 0% to 20%.

<Preparation of Liquid Crystal Display Device>

A visible side polarizing plate was detached from a liquid crystal cell of iPad (Registered Trademark, manufactured by Apple Inc.), and was used as a liquid crystal cell in an IPS mode.

The polarizing plate prepared as described above was bonded to the liquid crystal cell instead of the detached polarizing plate, and thus, each liquid crystal display device was prepared. At this time, the polarizing plate was bonded to the liquid crystal cell such that an absorption axis of the polarizing plate and an optical axis of a liquid crystal layer in the liquid crystal cell were in a vertical direction at the time of observing a surface of a substrate of the liquid crystal cell from a direction vertical to the surface.

TABLE 6

| | | Cellulose Acylate Film | | | | | |
|---|---|---|---|---|---|---|---|
| | | Organic Acid Satisfying Requirements of a to c | | | | | |
| | | Average Concentration [Mass %] | | Ratio of Organic Acid Existing in Region from | Acetyl Substitution | | Mass Ratio of Organic Acid Satisfying |
| | Added | | | Surface to ½ of | Degree | | Requirements of a to |
| | Amount [phr] | Surface to 0.2 μm | Opposite Side Surface | Total Film Thickness in Depth Direction [Mass %] | DSo > Dsi | Inner Layer | Outer Layer | c/Compound Represented by Formula (3) |
| Example 1 | 1.3 | 0.32 | 1.05 | 100 | — | 2.87 | Absent | 100/0 |
| Example 2 | 1.3 | 0.35 | 1.05 | 100 | Not Satisfy | 2.87 | 2.81 | 100/0 |
| Example 3 | 1.3 | 0.17 | 1.05 | 100 | Satisfy | 2.44 | 2.81 | 50/50 |
| Example 4 | 1.3 | 0.21 | 1.05 | 100 | Satisfy | 2.44 | 2.86 | 87/13 |
| Example 5 | 1.3 | 0.19 | 1.05 | 100 | Satisfy | 2.44 | 2.87 | 32/68 |
| Example 6 | 1.0 | 0.12 | 0.81 | 100 | Satisfy | 2.44 | 2.81 | 95/5 |
| Example 7 | 1.6 | 0.26 | 1.30 | 100 | Satisfy | 2.43 | 2.81 | 13/87 |
| Example 8 | 1.3 | 0.21 | 1.05 | 100 | Satisfy | 2.44 | 2.81 | 50/50 |
| Example 9 | 1.3 | 0.20 | 1.05 | 100 | Satisfy | 2.44 | 2.81 | 50/50 |
| Example 10 | 1.0 | 0.08 | 0.82 | 97 | Satisfy | 2.44 | 2.81 | 50/50 |
| Example 11 | 1.3 | 0.28 | 1.05 | 100 | — | 2.87 | Absent | 100/0 |

TABLE 6-continued

| | | | | | | | | |
|---|---|---|---|---|---|---|---|---|
| Example 12 | 1.3 | 0.37 | 1.05 | 100 | — | 2.87 | Absent | 100/0 |
| Example 13 | 1.3 | 0.22 | 1.05 | 100 | Satisfy | 2.44 | 2.81 | 50/50 |
| Example 14 | 1.3 | 0.15 | 1.05 | 100 | Satisfy | 2.44 | 2.81 | 50/50 |
| Example 15 | 1.3 | 0.25 | 1.05 | 100 | Satisfy | 2.44 | 2.81 | 50/50 |
| Example 16 | 1.3 | 0.23 | 1.05 | 100 | Satisfy | 2 44 | 2.81 | 50/50 |
| Comparative Example 1 | 1.0 | 0.81 | 0.81 | 49 | — | 2.87 | Absent | 100/0 |
| Comparative Example 2 | 5.0 | 4.04 | 4.03 | 50 | — | 2.87 | Absent | 100/0 |
| Comparative Example 3 | 0.7 | 1.41 | 0.56 | 100 | Satisfy | 2.45 | 2.79 | 100/0 |
| Comparative Example 4 | 3.0 | 9.44 | 2.38 | 100 | Satisfy | 2.45 | 2.79 | 100/0 |
| Comparative Example 5 | 1.2 | 13.45 | 0.91 | 100 | Not Satisfy | 2.87 | 2.81 | 100/0 |

| | Presence or Absence of Liquid Crystal Layer | Presence or Absence of Hard Coat Layer | Film Thickness (μm) | Evaluation Result | | Bleed Out |
|---|---|---|---|---|---|---|
| | | | | Durability of Polarizer | | |
| | | | | 410 nm | 700 nm | |
| Example 1 | Absent | Absent | 41 | 4.1 | 1.1 | Absent |
| Example 2 | Absent | Absent | 39 | 4.5 | 1.0 | Absent |
| Example 3 | Absent | Absent | 39 | 3.2 | 0.1 | Absent |
| Example 4 | Absent | Absent | 39 | 4.1 | 1.0 | Absent |
| Example 5 | Absent | Absent | 39 | 4.1 | 1.1 | Absent |
| Example 6 | Absent | Absent | 40 | 4.3 | 1.0 | Absent |
| Example 7 | Absent | Absent | 40 | 4.5 | 1.0 | Absent |
| Example 8 | Present | Absent | 41 | 3.3 | 0.1 | Absent |
| Example 9 | Absent | Present | 46 | 3.4 | 0.1 | Absent |
| Example 10 | Absent | Absent | 11 | 3.8 | 0.2 | Absent |
| Example 11 | Absent | Absent | 41 | 4.3 | 1.2 | Absent |
| Example 12 | Absent | Absent | 41 | 4.0 | 1.0 | Absent |
| Example 13 | Present | Absent | 41 | 3.2 | 0.1 | Absent |
| Example 14 | Absent | Absent | 41 | 3.6 | 0.2 | Absent |
| Example 15 | Present | Absent | 41 | 3.3 | 0.2 | Absent |
| Example 16 | Present | Absent | 41 | 3.5 | 0.3 | Absent |
| Comparative Example 1 | Absent | Absent | 40 | 9.2 | 4.1 | Absent |
| Comparative Example 2 | Absent | Absent | 40 | 3.4 | 0.1 | Present |
| Comparative Example 3 | Absent | Absent | 40 | 9.1 | 4.3 | Absent |
| Comparative Example 4 | Absent | Absent | 39 | 3.9 | 0.3 | Present |
| Comparative Example 5 | Absent | Absent | 39 | 4.6 | 1.0 | Present |

In the tables, per hundred resin (plan) which is unit of the added amount of organic acid indicates parts by mass with respect to 100 parts by mass of cellulose acylate.

As apparent from the tables described above, it was found that in the cellulose acylate films of the examples in which the average concentration of the organic acid satisfying the requirements of a to c from the surface to 0.2 μwas lower than the average concentration from 0.2 μm to the opposite side surface, durability of the polarizer was improved, and bleed out of an additive for improving the durability of the polarizer could be suppressed even though the added amount of the organic acid was small. In contrast, in a case where the added amount of the organic acid was small, in the cellulose acylate films of Comparative Examples 1 and 3 in which the average concentration of the organic acid from the surface to 0.2 μm was greater than or equal to the average concentration from 0.2 μm to the opposite side surface, the durability of the polarizer deteriorated compared to the examples. In addition, in the cellulose acylate films of Comparative Examples 2 and 4 in which the added amount of the organic acid was large, and the average concentration of the organic acid from the surface to 0.2 μm was greater than or equal to the average concentration from 0.2 μm to the opposite side surface, the bleed out of the organic acid was observed. In Comparative Example 5 in which the average concentration of the organic acid from the surface to 0.2 μm was considerably higher than the average concentration from 0.2 μm to the opposite side surface, the bleed out of the organic acid was also observed.

What is claimed is:

1. A cellulose acylate film, containing:
   an organic acid satisfying requirements of a to c,
   wherein a film thickness of the cellulose acylate film is greater than or equal to 3 μm, and
   an average concentration of the organic acid in a region from one surface of the cellulose acylate film to a depth of 0.2 μm is lower than an average concentration of the organic acid in a residual region of the cellulose acylate film other than the region,
   a: having a structure in which a polyhydric alcohol and a polyvalent carboxylic acid are bonded by forming an ester bond,
   b: the total number of molecules of the polyhydric alcohol and a monovalent or more carboxylic acid forming the organic acid being greater than or equal to 3, and
   c: having at least one non-substituted carboxyl group derived from the polyvalent carboxylic acid, and wherein greater than or equal to 80 mass % of the organic acid exists in a region from the one surface of the cellulose acylate film to ½ of a total film thickness in a depth direction.

2. The cellulose acylate film according to claim 1, wherein the cellulose acylate film is a single layer film, or a multilayer film formed of an inner layer and one or more outer layers.

3. The cellulose acylate film according to claim 1, wherein the cellulose acylate film is a multilayer film formed of an inner layer and one or more outer layers, an acyl substitution degree of cellulose acylate configuring the outer layer and the inner layer of the cellulose acylate film satisfies Expression 2 described below, $$DSo > DSi \qquad \text{Expression 2:}$$

in Expression 2, DSo represents an acyl substitution degree of cellulose acylate configuring the outer layer, and DSi represents an acyl substitution degree of cellulose acylate configuring the inner layer.

4. The cellulose acylate film according to claim 1, further containing:
a compound represented by Formula 3,

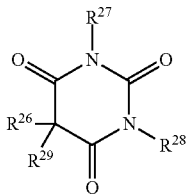

Formula 3 in Formula 3, $R^{26}$ represents an alkyl group, an alkynyl group, or an aromatic hydrocarbon group, $R^{27}$ and $R^{28}$ each independently represent a hydrogen atom, an alkyl group, an alkenyl group, an aromatic hydrocarbon group, or an aromatic heterocyclic group, $R^{29}$ represents a hydrogen atom, an alkyl group, or an aromatic hydrocarbon group, and $R^{26}$, $R^{27}$, $R^{28}$, and $R^{29}$ may each independently have a substituent.

5. The cellulose acylate film according to claim 4 wherein a mass ratio of the organic acid to the compound represented by Formula 3 is 50:50.

6. The cellulose acylate film according to claim 1, wherein the film thickness is 10 to 80 μm.

7. A manufacturing method of the cellulose acylate film according to claim 1, comprising:
a step of applying an organic acid satisfying requirements of a to c onto a precursor cellulose acylate film, thus forming the cellulose acylate film,
a: having a structure in which a polyhydric alcohol and a polyvalent carboxylic acid are bonded by forming an ester bond,
b: the total number of molecules of the polyhydric alcohol and a monovalent or more carboxylic acid forming the organic acid being greater than or equal to 3, and
c: having at least one non-substituted carboxyl group derived from the polyvalent carboxylic acid.

8. A laminate, comprising:
the cellulose acylate film according to claim 1; and
a liquid crystal layer or a hard coat layer,
wherein the liquid crystal layer or the hard coat layer exists on the other surface of the cellulose acylate film on a side opposite to the one surface.

9. A polarizing plate, comprising:
a polarizer; and
the laminate according to claim 8.

10. A liquid crystal display device, comprising:
the laminate according to claim 8.

11. A polarizing plate, comprising:
a polarizer; and
the cellulose acylate film according to claim 1.

12. A liquid crystal display device, comprising:
the cellulose acylate film according to claim 1.

* * * * *